United States Patent
Erhart et al.

(10) Patent No.: US 11,418,648 B2
(45) Date of Patent: Aug. 16, 2022

(54) ENHANCED DIGITAL MESSAGING

(71) Applicant: Avaya Management L.P., Santa Clara, CA (US)

(72) Inventors: George Erhart, Loveland, CO (US); Reinhard Klemm, Basking Ridge, NJ (US); Wen-Hua Ju, Monmouth Junction, NJ (US); Michael Sisselman, New York, NY (US); Atsushi Hirano, Alameda, CA (US)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/934,277

(22) Filed: Jul. 21, 2020

(65) Prior Publication Data

US 2021/0029246 A1 Jan. 28, 2021

Related U.S. Application Data

(60) Provisional application No. 62/879,084, filed on Jul. 26, 2019.

(51) Int. Cl.
H04M 3/51 (2006.01)
H04L 51/02 (2022.01)
G06Q 30/02 (2012.01)

(52) U.S. Cl.
CPC .......... *H04M 3/5183* (2013.01); *H04L 51/02* (2013.01); *H04M 3/5166* (2013.01); *H04M 3/5175* (2013.01); *G06Q 30/0281* (2013.01)

(58) Field of Classification Search
CPC ............. H04M 3/5183; H04M 3/5166; H04M 3/5175; H04L 51/02; G06Q 30/0281
USPC .................................................... 379/265.04
See application file for complete search history.

(56) References Cited

U.S. PATENT DOCUMENTS

| | | | |
|---|---|---|---|
| 6,449,358 | B1 | 9/2002 | Anisimov et al. |
| 9,330,422 | B2 | 5/2016 | Bourdaillet et al. |
| 9,635,067 | B2 | 4/2017 | Hibbard et al. |
| 10,567,314 | B1 * | 2/2020 | Chang ................... H04N 7/155 |
| 2003/0185379 | A1 | 10/2003 | O'Connor et al. |
| 2012/0076283 | A1 | 3/2012 | Ajmera et al. |
| 2013/0282844 | A1 | 10/2013 | Logan et al. |
| 2014/0137200 | A1 | 5/2014 | Logan et al. |
| 2016/0065519 | A1 | 3/2016 | Waltermann et al. |

(Continued)

OTHER PUBLICATIONS

Notice of Allowance for U.S. Appl. No. 16/867,347, dated Mar. 12, 2021 7 pages.
Official Action for U.S. Appl. No. 16/934,267, dated Mar. 29, 2021 22 pages.
Extended Search Report for European Patent Application No. 20187488.0, dated Dec. 10, 2020 10 pages.

(Continued)

*Primary Examiner* — Ahmad F. Matar
*Assistant Examiner* — Jirapon Intavong
(74) *Attorney, Agent, or Firm* — Sheridan Ross P.C.

(57) ABSTRACT

Embodiments of the disclosure provide a method of processing messages received in an asynchronous communication system. In some embodiments, the method includes analyzing interactions on a digital communication channel, determining that the interactions have paused for an amount of time, analyzing content of the interactions to determine an estimate of the amount of time, updating a state of the agent to release the agent for the estimated amount of time, and setting a timer that will automatically change the state of the agent back to an occupied state for the interactions at a future time that aligns with an expiration of the timer.

20 Claims, 30 Drawing Sheets

(56) References Cited

U.S. PATENT DOCUMENTS

| | | |
|---|---|---|
| 2017/0017971 A1 | 1/2017 | Moreau et al. |
| 2017/0323325 A1 | 11/2017 | Hamedi |
| 2018/0083906 A1 | 3/2018 | Jayaram et al. |
| 2018/0084111 A1* | 3/2018 | Pirat .................. H04L 51/04 |
| 2018/0103149 A1* | 4/2018 | Skiba .................. H04L 51/02 |
| 2018/0189273 A1 | 7/2018 | Campos et al. |
| 2018/0268318 A1 | 9/2018 | Matam et al. |
| 2018/0309801 A1 | 10/2018 | Rathod |
| 2019/0068527 A1 | 2/2019 | Chen et al. |
| 2019/0102701 A1 | 4/2019 | Singaraju et al. |
| 2019/0102781 A1 | 4/2019 | Myer et al. |
| 2019/0188590 A1 | 6/2019 | Wu et al. |
| 2020/0036783 A1 | 1/2020 | Bourassa et al. |
| 2020/0128053 A1 | 4/2020 | Rosanuru et al. |
| 2020/0412560 A1 | 12/2020 | Tofighbakhsh et al. |

OTHER PUBLICATIONS

Extended Search Report for European Patent Application No. 20187495.5, dated Dec. 15, 2020 9 pages.

Extended Search Report for European Patent Application No. 20187502.8, dated Dec. 17, 2020 7 pages.

Official Action for U.S. Appl. No. 16/867,347, dated Dec. 4, 2020 7 pages.

Notice of Allowance for U.S. Appl. No. 16/934,267, dated Jul. 23, 2021 7 pages.

Official Action for India Patent Application No. 202014031517, dated Jul. 12, 2021 7 pages.

Official Action for India Patent Application No. 202014031538, dated Sep. 17, 2021 6 pages.

\* cited by examiner

ENHANCED DIGITAL MESSAGING

CROSS REFERENCE TO RELATED APPLICATION

The present application claims the benefit under 35 U.S.C. § 119(e) of U.S. Provisional Application Ser. No. 62/879,084, filed Jul. 26, 2019, entitled "ENHANCED DIGITAL MESSAGING", which is hereby incorporated herein by reference in its entirety.

FIELD

Embodiments of the present disclosure relate generally to communication methods and specifically to communication methods performed in an asynchronous communication system.

BACKGROUND

Synchronous communication channels provide a definitive end-of-session indication. For example, when a caller hangs up or a web chat user closes their webpage or browser, it is relatively easy to determine that the conversation over that synchronous communication channel has ended.

BRIEF SUMMARY

Asynchronous communication channels, as compared to synchronous communication channels, do not provide any indication of the end of a "session" and the determination of whether a particular interaction has ended becomes more difficult. Embodiments of the present disclosure aim to solve this challenge of asynchronous communication channels and further aim to enable contact centers to utilize asynchronous communication channels in an efficient and intelligent manner. Moreover, embodiments of the present disclosure provide mechanisms for enabling a customer to interact with a contact center via a digital asynchronous communication channel and then resume stalled or paused interactions in a seamless manner. Embodiments of the present disclosure also provide a system that enables the contact center to intelligently determine whether the customer is trying to resume a previous topic of conversation or start a new topic of conversation and then feed that information to a contact center agent, thereby allowing the agent to appropriately continue interacting with the customer or begin a different interaction with the customer. In some embodiments, determining that the customer desires to start a new topic of conversation may cause the contact center to assign a new agent to the customer rather than having the customer continue their conversation with a previously-assigned agent, which may be particularly helpful in a contact center employing skill-based contact routing. The new agent assigned to handle the new topic of conversation may correspond to a human agent or a chatbot. In some embodiments, it may be beneficial to re-route a customer to the same agent that previously handled interactions with the customer, who is familiar with a previous customer/topic, and in doing so efficiencies of the contact center can be improved in addition to possibly improving customer satisfaction.

In some embodiments, the conversation may appear as a simple continuation of the message exchanges to the customer and the stall in the conversation may appear seamless. The customer is allowed to simply enter a response to a previous message sent by the contact center agent (whether an automated/chatbot agent/virtual assistant or human agent). From the customer's perspective, starting a new topic is as simple as ignoring the previous messages and sending in new messages on the new/different topic. In either event, the customer is allowed to intuitively interact with the contact center via the digital asynchronous communication channel.

Embodiments of the present disclosure also provide mechanisms to enable the contact center to efficiently interact with the customer. For instance, embodiments of the present disclosure enable the contact center to determine whether or not a customer has disengaged from a conversation. If in automation, the contact center is enabled to determine whether or not the conversation can be parked and/or whether a chatbot dialog context can be saved and restored, and how much time should be allowed to pass until the context is no longer saved. If a human agent is being utilized, then the contact center is desirous to know whether and when the agent can be released to perform other activities or, if the customer is re-engaging the conversation, whether the agent should be relieved of other tasks to enable their concentration to be placed on the current interaction with the customer.

As used herein, automation of a contact center may refer to a behavior of the contact center whereby interactions are managed by a chatbot, which may use directed dialog based on rules (e.g., expert systems) or Artificial Intelligence (AI).

It should be appreciated that conversations can be either with an automated agent (e.g., a chatbot) or a human agent. In some embodiments, a digital asynchronous communication channel includes, but is not limited to, a communication modality that is configured to enable digital message communications between a customer's communication device (e.g., a client device, a mobile communication device, a smart phone, a tablet, a PC, a laptop, etc.) and an agent's communication device (e.g., a client device, a mobile communication device, a smart phone, a tablet, a PC, a laptop, a server executing a chatbot, etc.). In some embodiments, the digital asynchronous communication channel may include or utilize one, some, or many different communication pathways, protocols, or messaging services. Non-limiting examples of messaging services that may be supported by a digital asynchronous communication channel include direct digital messaging (e.g., direct chat, SMS text, email, etc.), social media messaging (e.g., social media posts, social media direct messaging, etc.), webchats, or any other communication protocol that enables conversations to occur and be memorialized in non-real-time or near-real-time. While live voice and video conversations are not generally carried out via an asynchronous communication channel, it should be appreciated that embodiments of the present disclosure are contemplated to also facilitate voice and/or video communications between a contact center agent and customer.

Specific, but non-limiting examples of digital asynchronous communication channels include: (1) "Over-the-Top" (OTT) channels, including: Facebook Messenger, Twitter DM, WeChat, WhatsApp, Apple Business Chat, LINE, KakaoTalk; (2) "Telco" channels, including: SMS and Google RCS; (3) outbound, App-to-Person ("A2P") messages, that are used by enterprise customers to facilitate various enterprise-specific communications (e.g., notifications, alerts, promotions, etc.); and/or (4) "Real Time Messaging" (RTM) channels, including: In-App messaging (Android, iOS and W/eb), Push messaging (Android, iOS and Browser Notifications), etc.

The A2P messages represent outbound messages initiated from a contact center that are directed to a customer. Examples of A2P messages include, without limitation: A) We received your completed application . . . your mortgage application is being reviewed; B) There is a severe weather condition so your flight is delayed; C) I see that you are traveling next week to NYC . . . are you interested in tickets to Hamilton?; etc. It should be appreciated that A2P messages may or may not be related to the previous messages and may be packaged accordingly and seamlessly into a conversation with a customer. It should be appreciated that the A2P messages could represent a change of topic initiated by the contact center. The response from the customer may or may not take up the conversation change. If not taken up, the customer can still either resume a prior topic or initiate a new topic that is neither the prior topic nor the topic initiated by the A2P message.

Embodiments of the present disclosure also provide a system that is capable of determining the "end" of a conversation versus a temporary disengagement with the likelihood of resuming the conversation. It may be possible to enable the system to determine a likelihood of a conversation resuming at some point in the future either completely autonomously or with the assistance of a human agent. For instance, content modeling can be used to determine the likelihood that a conversation has completed. A topic confidence score analyzes the data to determine if there is an intent to remain in the current context and/or topic; begin or move to a related context and/or topic; or to begin and move to a different context and/or topic altogether. Using historical data of communication patterns with this customer along with customer relationship management information (information from schedules, demographics, likes and dislikes, known emotional and attitudinal attributes, and previous experience with the call center) assists in the modeling of whether or not this customer is likely available to engage in a conversation, or they are likely to not be available and will disengage from this conversation.

Analysis of the interaction will assist the call center workforce management system to determine when an agent (human or bot) should be queued to resume a particular conversation and reengage the customer or to disengage from the current conversation thereby allowing the agent to be queued to a different interaction. Analysis of the interactions, for example, by analyzing the transcripts of the conversation assist in the determination of the rate of changes in the conversation. The velocity of exchanges or message turns and the rate at which the velocity changes in the conversation can show whether the conversation is speeding up in a culmination on a particular topic and/or possibly resolving or finalizing the interaction. Likewise, the velocity of change in the conversation can show whether the call is slowing down and no resolution to the issue will occur soon or in a specific period. Velocity of change provides information to the workforce management system that will determine when to queue more work for the agent, take away work from the agent, or determine when to delay previously scheduled work.

Aspects of the present disclosure include providing a system that is capable of: (1) determining the resumption of a prior conversation versus as new conversation on a different topic; (2) determining the likelihood of a disengagement with the goal of freeing the agent to do other work; (3) measuring the engagement of the digital channel user/customer to compute a "loading" factor for the agent and then determine whether to remove tasks from the agent or add tasks to the agent; (4) predicting likely re-engagement after a disengagement for outreach and estimating such times of predicted re-engagement; and/or (5) tracking the periods of digital engagement to facilitate the best times for proactive notifications or offers to resume conversation.

Embodiments of the present disclosure enable an automated system to analyze a new customer input (e.g., a new message received from a customer communication device) after a period of disengagement to see if the newly received message is continuing the existing topic or starting a new topic. In some embodiments, this is achieved by training Intent/Topic models to label the topic of the input. Topic change may be indicated by a high probability classification of a different topic over the prior conversation topic from before the disengagement. Topic continuity can be indicated by either a high probability of the topic that matches the prior topic or a very low probability of any topic.

According to some embodiments, automated components of a contact center (e.g., a dialog engine and/or chatbot engine) may have access to a set of "trained" intents that represent possible topics that a user would engage in with the contact center. Thus, it should be appreciated that different intents may be trained for a particular contact center as one contact center may support conversations on some topics that other contact centers may not support. The training of the intents and construction of the dialog engine are services contemplated by embodiments of the present disclosure. There may be additional intents that represent certain classes of response that are more generic including yes/no type confirmation intents and others like "banter" that represent polite off topic user messages that need a response, but don't advance the state of the dialog. There may be dialog structural components that control the scope of the dialog with the user depending on the chatbot engine being used.

In some embodiments, a chatbot engine is configured to generate a confidence score associated with a new input and the existing dialog state. A high confidence score (e.g., with values above some pre-determined threshold) will cause the dialog engine to advance the dialog state. A low confidence may indicate that the input does not match expectations at the given point in the dialog state, so a default response (typically something like: "I'm sorry, I don't understand. Please try again.") is sent back to the customer by the chatbot engine and the dialog state is not advanced.

In some embodiments, entities may correspond to data items that the chatbot engine can recognize as values used to drive a transaction. Non-limiting examples of entities used by the chatbot engine include account numbers, PINs, part numbers, and any other descriptive value that would be needed as part of an automated dialog. It is anticipated that either the chatbot engine or the dialog engine that invokes the chatbot engine stores the state of the dialog between input messages as required by the chatbot engine.

In some embodiments, a customer may be allowed to have a conversation with a chatbot engine running a prewritten dialog engine that includes some or all of the following components: trained intents, system provided intents, entities, and dialog structure. Either the dialog engine or the chatbot engine stores the state of the dialog so that the next input message can be applied to that state to advance to a next state. A user may be allowed to suspend the conversation for some period of time by not responding to the last chatbot engine message and the communications channel does not provide any signal of disconnection. At some time later, the customer may re-engage the conversation by sending a new message on the still-open asynchronous communication channel. The message may be passed to the chatbot engine for evaluation. The chatbot engine may respond in the following ways: (a) The user input is the expected input, the intent confidence is high, the chatbot engine returns a response and advances the dialog state; or (b) The user input is not a match for the expected input and intent confidence is low, the chatbot engine returns the default response and does not advance the dialog state. In the case of executing response (b), the chatbot engine may be rerun using a neutral/initial dialog state and observe the confidence score. If the new input matches another intent with high confidence, then the prior dialog state is may be abandoned and a new dialog state is started with the new user input.

The above may be better understood with the following example. Consider a conversation on WIFI connectivity issues with the following message exchange:

Automated Agent: Try turning Wifi off then on to see if it fixes the problem.

<period of disengagement>

Customer: I dropped my phone. Where can I get it repaired?

The customer response in this case is for a different topic than solving the WIFI connectivity issues. Furthermore, the new topic for phone repair may receive a substantially higher topic confidence score than other topics and, therefore, the prior chatbot dialog state (dealing with the WIFI issue) is discarded and a new dialog state related to phone repairs is established.

Consider another conversation with a slightly different customer response:

Automated Agent: Try turning Wifi off then on to see if it fixes the problem.

<period of disengagement>

Customer: No, I am still having problems.

According to at least some embodiments of the present disclosure, depending on the chatbot engine and dialog engine, the chatbot engine could return a high confidence if it were designed to look for an affirmation as an indication of success or failure and in that case, the chatbot engine would advance the dialog state and return an appropriate prompt. For chatbot engines that don't use intent matching for sub-dialogs, the dialog state would be monitored and if it advances, then the customer input would be seen as indicating that the prior dialog state should be continued and if it does not advance, then the re-evaluation of the user input with a neutral or initial state would be executed.

Embodiments of the present disclosure also contemplate enabling a chatbot engine and/or dialog engine to consider and use entity inputs. Consider the following message exchange:

Automated agent: Please provide the serial number for your modem so that I can check for a firmware upgrades.

<customer disengages until such time as they can find the modem serial number>

Customer: The serial number is Z1234N5678

In this example, the input does not provide an intent, but rather provides an entity value (i.e., Z1234N5678). As with an intent based input, the entity input will either be expected (therefore advancing the dialog state) or unexpected (not advancing the dialog state). The example shown above does advance the dialog and, therefore, would not result in any action by the proposed chatbot engine and/or dialog engine. If the dialog does not advance, then a further analysis of topic confidence scores for the newly received message could be run. In this case, it would also have low confidence because the user input is an entity data input, not an intent. Accordingly, the default response from the chatbot engine would be sent to the user and the dialog state would not advance.

As used herein, a message may include one or multiple electronic records, text, rich media, or data structures that are transmitted from one communication device to another communication device via a communication network. A message may be transmitted via one or more data packets and the formatting of such data packets may depend upon the messaging protocol used for transmitting the electronic records over the communication network.

As used herein, a conversation may correspond to an exchange of observations, opinions, questions, responses to questions, or ideas. A conversation topic may correspond to a particular subject or set of subjects that are discussed between two or more entities involved in a communication session (regardless of whether the session is synchronous or asynchronous).

As used herein, a topic classification may correspond to an identification of a conversation topic. The topic classification may include a classification number (e.g., where a particular number corresponds to a particular pre-defined topic). The topic classification may alternatively or additionally include a user-defined topic, a machine-defined topic, or some other description of a topic using a finite set of symbols or characters. A conversation may encompass one or multiple topics and, therefore, may be assigned one or many topic classifications, as appropriate.

A topic confidence score may correspond to a machine-generated value indicating a confidence or match probability that defines a closeness for a machine-generated topic classification. The topic confidence score may correspond to a scalar value, a percentage, or ratio and may be comparable to a predetermined threshold (which can be user-defined), which in a similar format (e.g., scalar value, percentage, ratio).

Interactions, as used herein, may correspond to two or more message exchanges between two or more entities over a digital communication channel. In some embodiments, an interaction may correspond to a question and response message pair, a question and question message pair, a statement and response message pair, or a set of messages.

As used herein, an agent state or state of an agent may include one or more of an AVAILABLE state, an OCCUPIED state, a BUSY state, an AFTER-CALL WORK (ACW) state, an UNAVAILABLE state, or any other agent state known or yet to be developed for use in a contact center.

As used herein, a conversation model may correspond to a data set that is useable in a neural network and that has been trained by one or more data sets that describe conversations or message exchanges between two or more entities. The conversation model may be stored as a model data file or any other data structure that is useable within a neural network or an AI system.

As used herein, a conversation velocity may correspond to a measure of a conversation speed as a function of the number of messages exchanged in a conversation over a period of time. The measure can also take in additional factors like the information density of the messages being exchanged or other features that could correspond to changes in conversation velocity. As can be appreciated, a derivative of the conversation velocity may describe whether a conversation is accelerating or decelerating.

It some embodiments, topics may eventually be uploaded into a Customer Relationship Management (CRM) system and/or customer journey application that is being executed within the contact center. The CRM system and/or customer journey application may be executed on a purpose-built server or may be executed by a server that is also implementing contact routing routines within the contact center.

In some embodiments, one or more machine learning models may be provided that encompass the likelihood of: abandon, abort, or requests for escalation to a supervisor. Such models may be used to train the neural networks utilized by the contact center or may stored and used for comparison to current interactions to determine whether or not the current interaction has any similarities with the machine learning models. Alternatively or additionally, machine learning models may be utilized that can be used to measure "frustration", "friction", or "inertia." If an interaction is determined to have a particular amount of similarity with any such model, then action may be taken within the contact center to avoid further possible frustration, friction, or inertia (e.g., invoking a supervisor assistance function or transferring the contact to a different agent).

Embodiments of the present disclosure may also consider the derivation of meta-data that is associated with a message or conversation. In some embodiments, the meta-data could be useful to convey additional context to an agent.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

Figure 1:
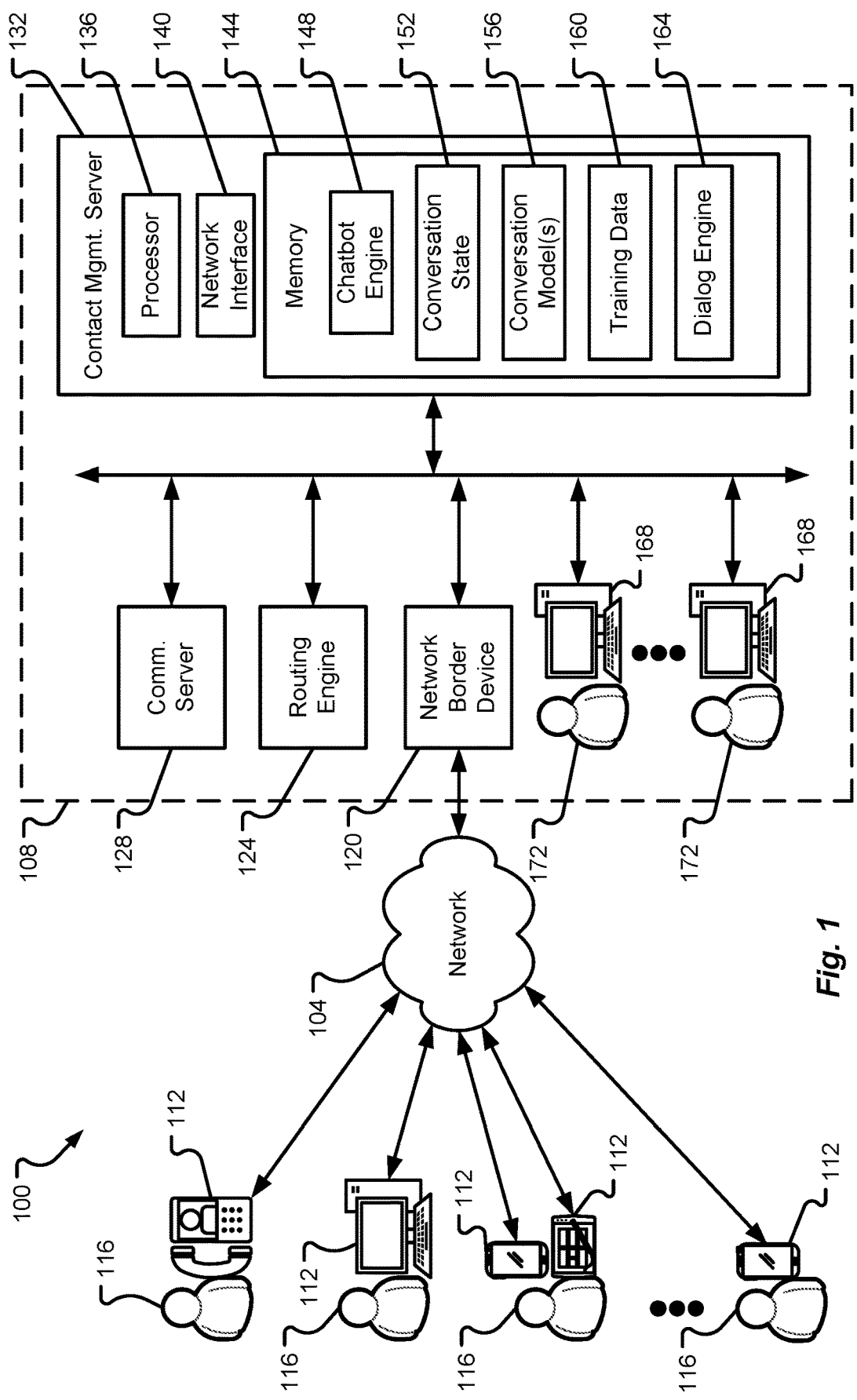
FIG. 1 is a block diagram illustrating a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for utilizing chatbots to support interactions with human users. Embodiments of the disclosure also provide systems and methods that enable human users (e.g., customers) to interact with a contact center via an asynchronous communication channel. The human user is presented with an asynchronous communication channel to support efficient and intuitive communications with the contact center. Meanwhile, elements of the contact center are designed to present the human user with an appearance of constant availability and communication readiness, while handling the challenges associated with implementing and presenting an asynchronous communication channel.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. The customer 116 may correspond to a user or person that interacts with their customer communication device 112 to communicate with a resource of the contact center 108. Specifically, the contact center 108 may include a number of resources that facilitate customer 116 interactions via an asynchronous communication channel that is presented to and maintained for use by the customer 116 and one or more of their customer communication devices 112. As shown in FIG. 1, a customer 116 may utilize one or multiple customer communication devices 112 to interact with the contact center. Moreover, embodiments of the present disclosure contemplate that the customer 116 may use multiple different customer communication devices 112 to communicate via a single asynchronous communication channel. As a non-limiting example, a customer 116 may login to a web-based portal or authenticate themselves with a particular chat channel and then utilize the web-based portal or chat channel to communicate with any one of their customer communication devices 112.

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These customer communication devices 112 may also have any of a variety of applications, including for example, a database client and/or server applications, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 172 and/or chatbot 148 to interact with a customer 116 via a communication channel established between the customer communication device 112 and the contact center 108. In particular, the contact center 108 is shown to include a network border device 120 and a number of servers 124, 128, 132 that enable functionality of the contact center 108. The network border device 120 may correspond to one or a number of devices that establish and maintain information security for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that safely pass through the network border device 120 may be transferred to the communication server 128 or routing engine 124 for further analysis and processing (e.g., for inclusion with a particular conversation, for assigning/forwarding to a particular contact center agent 172, etc.).

In some embodiments, each server of the contact center 108 may be configured to perform a particular task or a set of tasks specific to supporting functions of the contact center 108. For instance, the routing engine 124 may correspond to a server or set of servers that are configured to receive messages from the network border device 120 and make routing decisions for the message(s) within the contact center 108. The communication server 128 may correspond to a single server or a set of servers that are configured to establish and maintain a communication channel between customers 116 and the contact center 108. In some embodiments, the routing engine 124 and communication server 128 may work in cooperation to ensure that an appropriate agent 172 or set of agents 172 are assigned to a particular communication channel (e.g., an asynchronous communication channel) for purposes of servicing/addressing contacts initiated by customers 116 of the contact center 108. Specifically, but without limitation, the routing engine 124 may be configured to determine which agent 172 should be assigned to a particular communication channel for purposes of answering a customer's 116 question and/or for purposes of providing a service to the customer 116. The routing engine 124 may provide appropriate signaling to an agent's communication device 168 that enables the agent's communication device 168 to connect with the communication channel over which the customer 116 is communicating and to enable the agent 172 to view messages sent by the customer's communication device 112, which are eventually assigned to and posted on the appropriate communication channel. Even more specifically, the communication server 128 may establish and maintain a digital chat communication channel that is presented to the customer's communication device 112 and which enables the customer 116 to send chat messages to the contact center 108 when desired. When messages are received from a customer communication device 112 and assigned to a particular chat communication channel, the routing engine 124 may determine which agent 172 will service the customer's 116 needs (e.g., answer a question, provide a service, etc.) and then connect the selected agent's communication device 168 to the same chat communication channel, thereby enabling the agent 172 to engage in a chat session with the customer 116. Alternatively or additionally, as will be described in further detail herein, the routing engine 124 may connect an automated agent (e.g., a chatbot) to the communication channel to help service the customer's 116 needs in a similar way that an agent's communication device 168 is connected with the communication channel. The difference is that the automated agent (e.g., chatbot) may be configured to respond to the customer's 116 messages transmitted over the communication channel in an automated fashion (e.g., without requiring input from a human user). It should be appreciated that the routing engine 124 may be configured to connect both a human agent 172 and an automated agent (e.g., a chatbot) to the communication channel if it is desirable to allow the automated agent respond to the customer's 116 messages in a semi-automated fashion (e.g., where the chatbot generates a suggested reply to a message, but a human agent 172 is required to approve or edit the message prior to being transmitted/committed to the communication channel and delivered to the customer communication device 112).

Although described as a chat server, it should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. In addition to supporting text-based communications, the communication server 128 may also be configured to support non-text-based communications such as voice communications, video communications, and the like.

Another server or set of servers that may be provided in the contact center 108 is a contact management server 132. The contact management server 132 may be configured to manage the contacts or work items that exist within the contact center 108 and that represent tasks to be performed by a human agent 172 and/or automated agent (e.g., a chatbot) in connection with providing a service to a customer 116. The contact management server 132 may be configured to maintain state information for some or all of the contacts in the contact center 108 at any given point in time. The contact management server 132 may also be configured to manage and analyze historical contacts as part of training and updating automated agents (e.g., a chatbot engine 148). In some embodiments, the contact management server 132 may maintain state information for human agents 172 in the contact center 108 and may further interact with the routing engine 124 to determine which agents 172 are currently available for servicing a contact and have the appropriate skills for servicing a contact. Additional capabilities of the contact management server 132 will be described in further detail with respect to operation of a chatbot engine 148 and a dialog engine 164, which are both shown to be provided by the contact management server 132.

While certain components are depicted as being included in the contact management server 132, it should be appreciated that such components may be provided in any other server or set of servers in the contact center 108. For instance, components of the contact management server 132 may be provided in a routing engine 124 and/or communication server 128, or vice versa. Further still, embodiments of the present disclosure contemplate a single server that is provided with all capabilities of the routing engine 124, the communication server 128, and the contact management server 132.

The contact management server 132 is shown to include a processor 136, a network interface 140, and memory 144. The processor 136 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The network interface 140 may be configured to enable the contact management server 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions that are executable by the processor 136 and that ultimately provide functionality of the communication management server 132 described herein. The memory 144 may also be configured to store data or information that is useable or capable of being called by the instructions stored in memory 144. One example of data that may be stored in memory 144 for use by components thereof is conversation state data 152. The conversation state data 152 may represent a particular state of one or multiple conversations occurring on a communication channel. The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the contact management server 132, it should be appreciated that the memory 144 may correspond to a memory device, database, or appliance that is external to the contact management server 132.

Illustratively, the memory 144 is shown to store a chatbot engine 148 for execution by the processor 136. In some embodiments, the chatbot engine 148 may correspond to a set of processor-executable instructions (e.g., a finite instruction set with defined inputs, variables, and outputs). In some embodiments, the chatbot engine 148 may correspond to an Artificial Intelligence (AI) component of the contact management server 132 that is executed by the processor 136. The chatbot engine 148, in some embodiments, may utilize one or more conversation models 156, which may be in the form of an artificial neural network, for recognizing and responding to messages transmitted by a customer 116 over a communication channel supported by the communication server 128. In some embodiments, the chatbot engine 148 may be trained with training data 160 and may be programmed to learn from additional conversations as such conversations occur or after conversations occur. In some embodiments, the chatbot engine 148 may update one or more of the conversation models 156 as it learns from ongoing conversations.

The memory 144 is also shown to include a dialog engine 164, which may be configured to support capabilities of the chatbot engine 148. It should be appreciated that the chatbot engine 148 and dialog engine 164 may be provided in a single component without departing from the scope of the present disclosure. The dialog engine 164 may be configured to analyze a conversation between a chatbot engine 148 and a customer 116 and determine, based on the analysis, a current state of the conversation (e.g., a dialog or conversation state 152). Accordingly, the dialog engine 164 may be configured to update the conversation state 152 based on a content of messages sent by a customer 116 and based on a content of messages sent by the chatbot engine 148. The dialog engine 164 may be configured to advance conversation states 152. In some embodiments, the chatbot engine 148 and/or dialog engine 164 may be configured to analyze messages received from a customer communication device 112, determine (e.g., with a confidence score) a topic of conversation associated with the message, and take certain actions based on the topic and/or based on the determined conversation state 152. These additional functions of the chatbot engine 148 and dialog engine 164 will be described in further detail herein.

As mentioned above, the chatbot engine 148 may be configured to operate using a set of guidelines (e.g., as a set of static instructions) or by using machine learning. Further details of a chatbot engine 148 utilizing machine learning will now be described with reference to FIG. 2. Again, the chatbot engine 148 utilizing machine learning may have access to training data 160 to initially train behaviors of the chatbot engine 148. The chatbot engine 148 may also be configured to learn from further conversations based on feedback, which may be provided in an automated fashion (e.g., via a recursive learning neural network) and/or a human-provided fashion (e.g., by a human agent 172 confirming or denying that a particular response prepared by the chatbot engine 148 was appropriate for a particular message received from a customer 116).

A learning/training module 204 of the chatbot engine 148 may have access to and use one or more conversation models 156. The conversation models 156 may be built and updated by the training/learning module 204 based on the training data and feedback. The learning/training module 204 may also be configured to access information from a reporting database 212 for purposes of building a bot response database 216, which effectively stores bot responses that have been previously provided by the chatbot engine 148 and have been identified as valid or appropriate under the circumstances (e.g., based on a positive response from a customer 116 and/or based on administrative user inputs). Responses within the bot response database 216 may constantly be updated, revised, edited, or deleted by the learning/training module 204 as the chatbot engine 148 engages in more conversations with customers 116.

Figure 2:
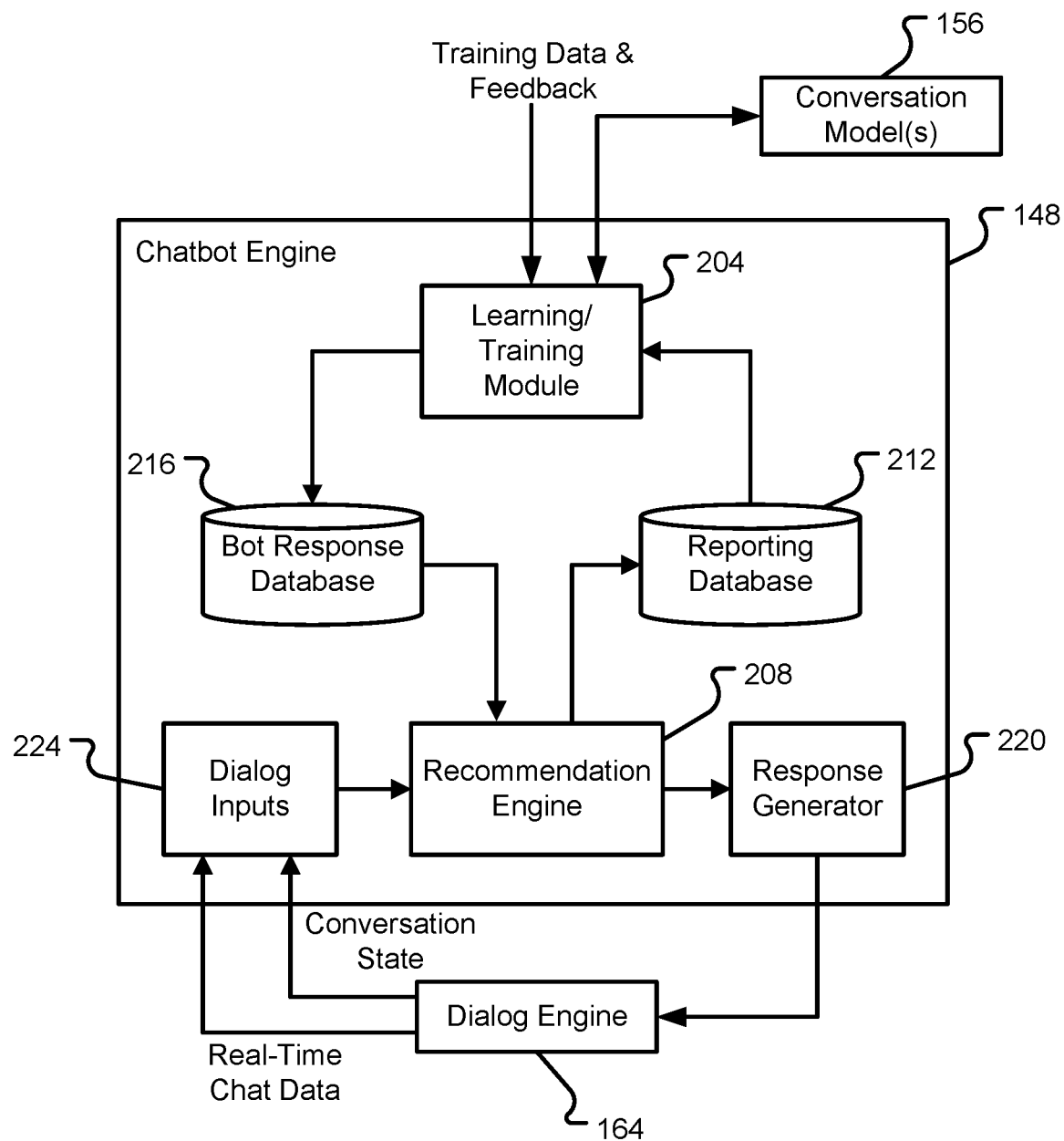
FIG. 2 is a block diagram depicting additional details of a chatbot engine in accordance with at least some embodiments of the present disclosure.

In some embodiments, the chatbot engine 148 may include a recommendation engine 208 that has access to the bot response database 216 and selects appropriate response recommendations from the bot response database 216 based on dialog inputs 224 received from the dialog engine 164. As shown in FIG. 2, the dialog engine 164 may provide dialog inputs 224 in the form of real-time chat data and/or in the form of conversation state 152 information. The real-time chat data may correspond to the content of a message received on a communication channel from a customer's communication device 112. In other words, the dialog engine 164 may be configured to retrieve message content from a digital communication channel and provide such content to the chatbot engine 148 in the form of dialog inputs 224. Using the dialog inputs and the bot response database 216, the recommendation engine 208 may be configured to recommend one or multiple responses to a response generator 220. The response generator 220 may be configured to provide a selected response to the dialog engine 164 for sending on the appropriate communication channel. Stated another way, the dialog engine 164 may be responsible for managing a state of a conversation and may provide the mechanism by which the chatbot engine 148 engages with the communication channel and the customer 116. For instance, the dialog engine 164 may produce a response message for a chat channel over which a customer 116 previously transmitted a message. The interactions between the chatbot engine 148 and customer 116 may represent a contact within the contact center 108 and the status of the contact may be determined by the dialog engine 164, which updates the conversation state 152 accordingly. In some embodiments, the chatbot engine 148 may be configured to interact with a customer 116 in such a way that the customer 116 is unaware they are interacting with an automated agent, but rather think themselves to be interacting with a human agent 172. To achieve this capability, the chatbot engine 148 may constantly be provided training data from conversations between human agents 172 and customers 116 that have occurred over a particular communication channel. It may be possible to train a chatbot engine 148 to have a particular skill (e.g., by training the chatbot engine 148 with conversations related to a particular topic such as sales, product troubleshooting, billing, reservation assistance, etc.). Accordingly, it should be appreciated that the contact center 108 may include a plurality of chatbot engines 148 of different types without departing from the scope of the present disclosure.

With reference now to FIGS. 3A-4B, additional capabilities and functions of a chatbot engine 148 and a contact center 108 will be described in accordance with at least some embodiments of the present disclosure. Specifically, each of FIGS. 3A-4B depict a screen shot of a graphical user interface 304 of an agent communication device 168 displaying a first conversation in accordance with at least some embodiments of the present disclosure. While particular conversations are shown for ease of description, it should be appreciated that embodiments of the present disclosure are not so limited. Moreover, while shown as an agent communication device 168, it should be appreciated that a customer communication device 112 may include a graphical user interface 304 that presents a same or similar version of the same conversation. Further still, in embodiments where the conversation is being handled in the contact center by a fully automated agent (e.g., the chatbot engine 148), there may not be a device within the contact center 108 that is actually depicted/rendering/displaying a version of the conversation. Instead, the conversation may be maintained in memory of the contact management server 132 and may not necessarily be reproduced for display via a communication device. The depiction of the conversation on a graphical user interface 304 is for purposes of understating the concepts described herein.

Figure 3A:
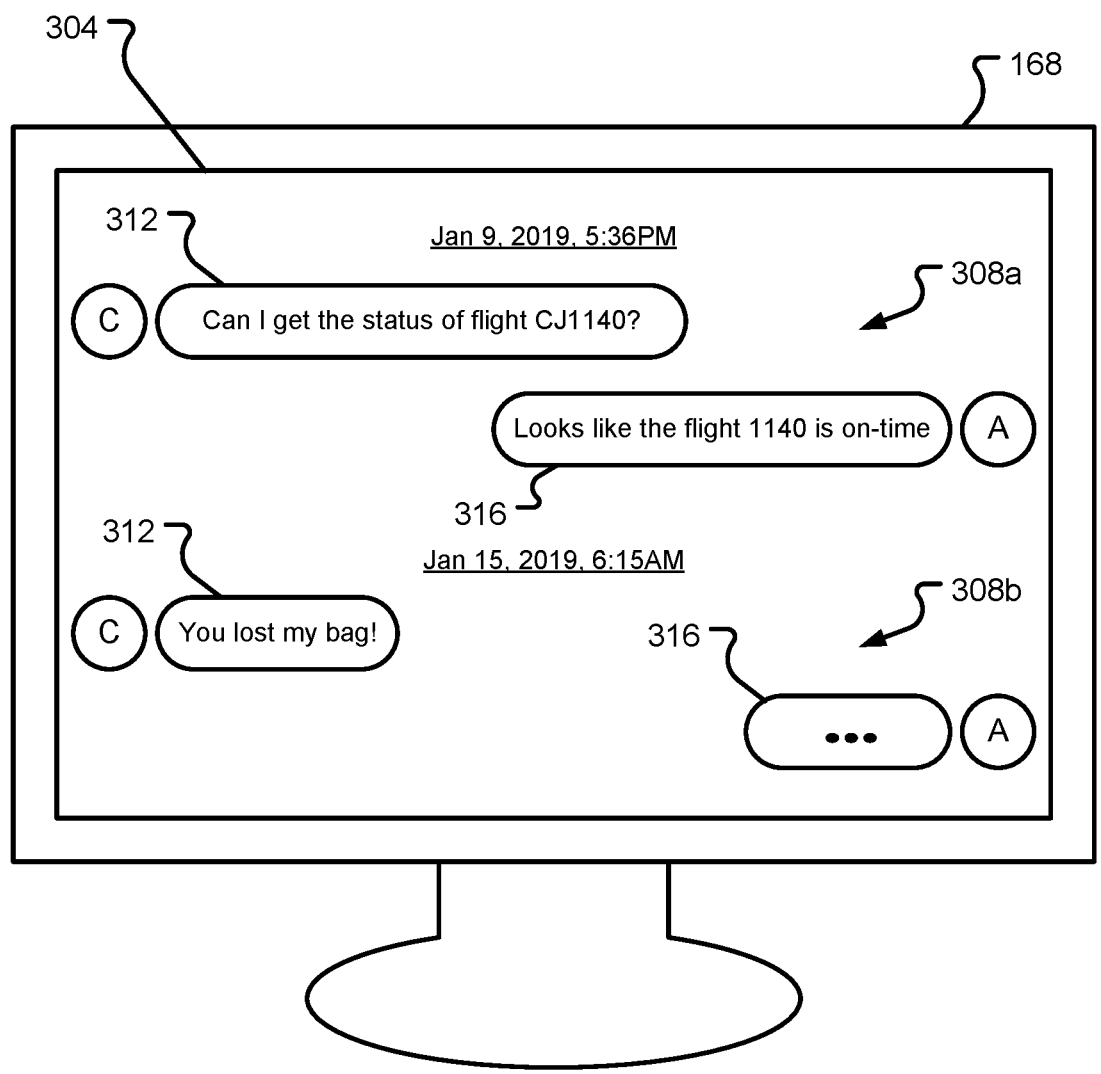
FIG. 3A is a screen shot depicting a graphical user interface of an agent communication device displaying a first conversation in accordance with at least some embodiments of the present disclosure.

Referring initially to FIG. 3A, a first example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

In the first example conversation, the agent "A" (e.g., in the form of an automated agent, such as the chatbot engine 148) has been interacting with the customer 116. At some point in time during the conversation, the customer 116 may provide a customer message 312 stating, "Can I get the status of flight CJ1140?" The chatbot engine 148 may respond with an agent message 316 stating, "Looks like the flight 1140 is on-time." As shown in the example, the first two messages exchanged between the customer 116 and agent may correspond to a first set of messages exchanged at or around a similar day/time (e.g., Jan. 9, 2019 at 5:36 PM). These set of messages exchanged at or around a similar day/time may be referred to as a first portion of a conversation 308a.

At some point later in time (e.g., 6 days later), the customer 116 may return to the communication channel and provide another customer message 312 stating, "You lost my bag!" Upon receiving this additional customer message 312 and having the customer message 312 added to the communication channel and ongoing conversation between the customer 116 and contact center 108, the chatbot engine 148 is now faced with a response decision. Embodiments of the present disclosure provide mechanisms for the chatbot engine 148 to determine an appropriate agent message 316 to send in response to the customer message 312 that was received on Jan. 15, 2019 at 6:15 AM. A first step to determining an appropriate agent message 316 to send in response to the customer message 312 is to determine whether or not the newly received customer message 312 relates to the same topic previously discussed in the first portion of the conversation 308a, or whether the newly received customer message 312 relates to a different topic. In other words, because the communication channel offered to the customer 116 is asynchronous and persists over an extended period of time, it is not appropriate or natural to assume that the newly received message is a continuation of the topic(s) being discussed in the first portion of the conversation 308a. Accordingly, embodiments of the present disclosure enable the chatbot engine 148 to analyze content of the newly received customer message 312 and determine a topic with which the newly received customer message 312 is associated. Specifically, the chatbot engine 148, with assistance from the dialog engine 164, may be configured to analyze the newly received customer message 312 and determine if a topic of the message substantially matches (e.g., corresponds to a continuation) of the topic determined for the message(s) in the first portion of the conversation 308a.

In some embodiments, the chatbot engine 148 may be configured to determine a topic classification for each and every customer message 312 received over the digital communication channel. As a conversation progresses (e.g., as additional messages are sent and received), the chatbot engine 148 may continue to determine a topic for each newly received customer message 312. If the chatbot engine 148 determines that the topic of a newly received customer message 312 corresponds to the same topic as a previously-received customer message 312, then the chatbot engine 148 may attempt to continue a dialog associated with that topic and may update a conversation state 152 accordingly. On the other hand, if the chatbot engine 148 determines that the topic of the newly received customer message 312 corresponds to a different topic with some degree of confidence or if the chatbot engine 148 determines that the newly received customer message 312 does not correspond to any topic with a particular degree of confidence, then the chatbot engine 148 may provide a different agent message 316 as part of the second portion of the conversation 308b. This may also involve changing the conversation state 152 for the second portion of the conversation 308b to a different topic than is associated with the first portion of the conversation 308a.

In some embodiments, the chatbot engine 148 may be configured to determine a topic associated with a customer message 312 based on analyzing the content of the customer message 312 and metadata associated with the customer message. Content of the customer message 312 may be analyzed using one or many different neural networks or conversation models 156. In some embodiments, the chatbot engine 148 may include or have access to a plurality of different conversation models 156, each of which is associated with or trained to determine whether a message corresponds to a particular topic. More specifically, the chatbot engine 148 may provide content of the newly received customer message 312 through a plurality of different conversation models 156.

Each conversation model 156 may be trained to determine whether or not the message content indicates the customer message 312 should be assigned a particular topic classification and provide a confidence score for the determination. As an example, a first conversation model 156 may be trained and designed to determine whether a message corresponds to a first topic (e.g., new device sales) and provide a confidence score on whether or not the message corresponds to the first topic. A second conversation model 156 may be trained and designed to determine whether a message corresponds to a second topic (e.g., troubleshooting for a device) and provide a confidence score on whether or not the message corresponds to the second topic. A third conversation model 156 may be trained and designed to determine whether a message corresponds to a third topic (e.g., billing inquiries) and provide a confidence score on whether or not the message corresponds to the third topic. The chatbot engine 148 may have access to any number (e.g., up to N, where N is any integer greater than or equal to one) of conversation models 156 which have been trained with different training data 160 uniquely designed for the particular topic.

To analyze the content of a customer message 312, the chatbot engine 148 may process the content of the customer message 312 using some or all of the conversation models 156 and receive outputs from each conversation model 156. If one conversation model 156 determines the customer message 312 is associated with a particular topic with more than a predetermined confidence score (e.g., a confidence score above 50%) and that particular topic received a higher confidence score than any other confidence score determined for any other topic, then the chatbot engine 148 may determine that the content of the customer message 312 should be associated with/assigned to the particular topic. The chatbot engine 148 may further compare the particular topic assigned to the newly received customer message 312 with topics assigned to previously received customer messages 312. If there is any match between topics, then the chatbot engine 148 may continue processing the newly received customer message 312 as a continuation of the first portion of the conversation 308a. If there is a mismatch between topics, then the chatbot engine 148 may interact with the dialog engine 164 to change the conversation state 152 and begin a dialog on the new topic rather than continuing the dialog on the previous topic.

If the chatbot engine 148 determines that the content of the customer message 312 does not provide a determination of a particular topic (e.g., no output of any particular conversation model 156 is determinative), then additional processing may be required or assumptions may be made by the chatbot engine 148. For instance, if the content of the newly received customer message 312 is not associated with any particular topic with more than a predetermined confidence score (e.g., a confidence score above 30%), then the chatbot engine 148 may determine that the newly received customer message 312 is topic neutral, which may suggest that the newly received customer message 312 is still a continuation of the first portion of the conversation 308a (e.g., because a new topic has not definitively been initiated by the customer 116). Using this assumption, the chatbot engine 148 may attempt to continue the dialog of the first portion of the conversation 308a when generating the next agent response 316 in the second portion of the conversation 308b. Additionally, if the topic for a customer message 312 is not determinable with a predetermined confidence score, then the chatbot engine 148 may request human agent 172 input, assistance, or approval prior to committing an agent response 316 to the communication channel. In some embodiments, as the chatbot engine 148 produces suggested responses that are approved by a human agent 172, those suggested responses may be recorded in the reporting database 212 and used to further tune or train the chatbot engine 148 for future message analysis.

The metadata that may be analyzed by the chatbot engine 148 may include a day/time at which the customer message 312 is received, a length of the customer message 312, an elapsed time between receiving a customer message 312 and a previous customer message 312, an elapsed time between transmitting an agent message 316 and receiving a new customer message 312, etc. The metadata may be considered in combination with the content analysis performed by the chatbot engine 148 as described above for purposes of determining a topic classification for the customer message 312 and for purposes of determining if the topic classification matches a topic classification assigned to a previously received customer message 312. In some embodiments, it may be possible to determine a topic with just content analysis or just metadata analysis, but a confidence score for a topic determination may be stronger if the topic determination is supported by both content analysis and metadata analysis. As can be appreciated, a confidence score for a topic determination may correspond to a combination of a confidence score based on content analysis and a confidence score based on metadata analysis.

As can be appreciated, the chatbot engine 148 may be configured to generate an appropriate agent response 316 to address or start a dialog with the customer for the newly received customer message 312. In this particular example, the time between receiving the new customer message 312 and the previous customer message 312 suggests that a new topic should be assigned to the newly received customer message 312 (e.g., based on metadata analysis). Similarly, the content of the newly received customer message 312 appears to be related to a topic of bag whereas the content of the previously received customer message 312 appears to be related to a topic of flight status. The chatbot engine 148 may be configured to determine a topic for each of the customer messages 312 and determine that the topics assigned to each customer message 312 are different. Based on a content analysis and metadata analysis, the chatbot engine 148 may, with a degree of certainty, determine that the newly received customer message 312 is assigned a new topic classification than the previously received customer message 312 and an appropriate agent response 316 may be generated. In some embodiments, the chatbot engine 148 and dialog engine 164 may update the conversation state 152 to relate to the new topic classification (e.g., bag) and initiate a dialog based on the new topic classification rather than continuing a discussion on the old topic classification (e.g., flight status). The initial agent response 316 may include content that attempts to confirm the new topic (e.g., "It appears you have an issue with your luggage. Is that correct?") before continuing a more detailed dialog on the new topic. Alternatively, the initial agent response 316 may include content that assumes the new topic determination is correct and initially attempts to progress the dialog (e.g., "I'm sorry to hear that. Please provide me with baggage tag number for the missing bag and I will see what I can do to help.").

Figure 3B:
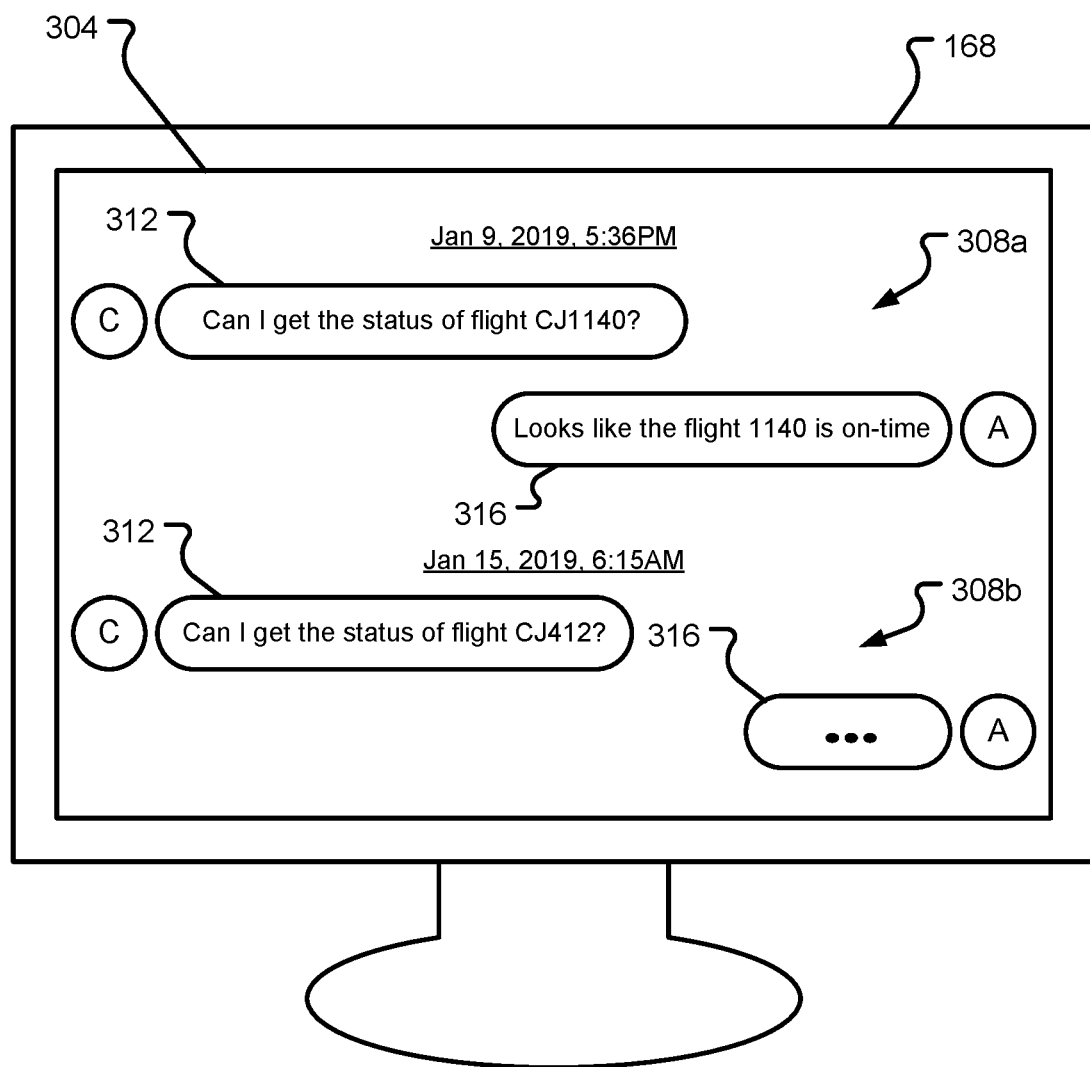
FIG. 3B is a screen shot depicting a graphical user interface of an agent communication device displaying a second conversation in accordance with at least some embodiments of the present disclosure.

Referring now to FIG. 3B, a second example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The second example conversation may be similar to the first example conversation in that the first conversation portion 308a is the same in both example conversations. The second example conversation differs from the first example conversation in that the second customer message 312 has different content in each example conversation. Specifically, in the second example conversation, the newly received customer message 312 states, "Can I get the status of flight CJ412?" In this example, the topic of the newly received customer message 312 may be determined to be the same or similar to the topic of the previously received customer message 312, particularly because the content of each message is so similar, but for different flight numbers. In some embodiments, the chatbot engine 148 may be configured to extract an entity value (e.g., the flight number) from the content of the newly received customer message 312 for purposes of preparing an agent response 316 thereto. Specifically, while the topics of both customer messages 312 are similar or the same, the agent response 316 thereto may be different and dependent upon the entity value (e.g., the flight number) contained in the content of the customer message 312. In some embodiments, the chatbot engine 148 may be configured to analyze or scan content of customer messages 312 for entity values that match an expected data pattern (e.g., a predetermined number of characters/symbols, a predetermined string size, a predetermined starting character or ending character, etc.) and then utilize any found entity values for purposes of preparing an agent response 316. As an example, the first agent response 316 in the first portion of the conversation 308a may provide flight status information for the flight associated with the entity value=CJ1140 whereas the second agent response 316 in the second portion of the conversation 308b may provide flight status information for the flight associated with the entity value=CJ412.

If an entity value does not match an expected data pattern, but the chatbot engine 148 determines that the content of the customer message 312 may possibly include an entity value, the agent response 316 may include a request for the customer 116 to confirm or reconfirm that they intended to provide an entity value (e.g., "Do you want the status of a flight? If so, can you confirm the <entity value name>?"). Accordingly, even though both customer messages 312 are determined to be associated with the same topic classification, the chatbot engine 148 may be trained to start a new dialog for the newly received customer message 312 based on different entity values found in each customer message 312.

Figure 3C:
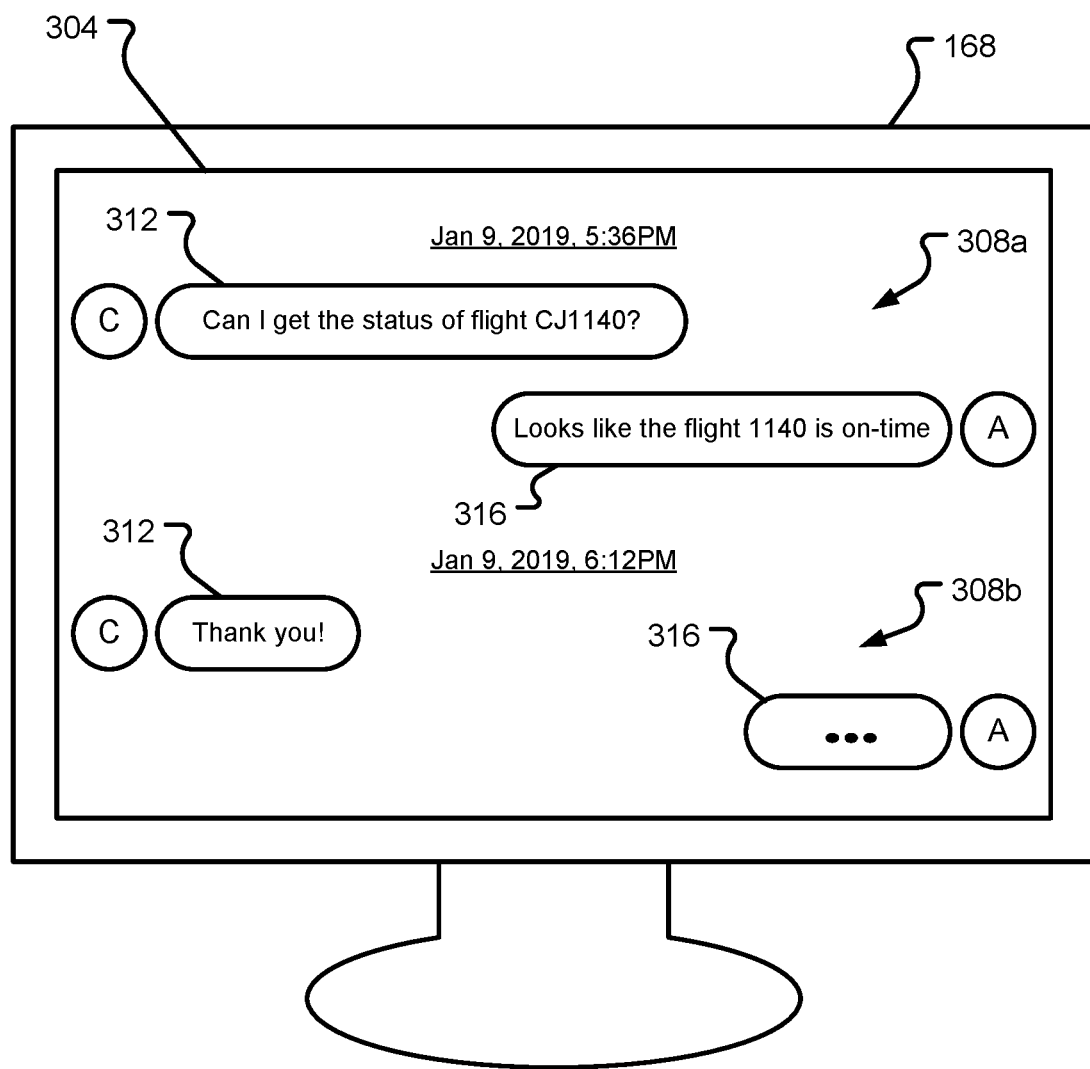
FIG. 3C is a screen shot depicting a graphical user interface of an agent communication device displaying a third conversation in accordance with at least some embodiments of the present disclosure.

Referring now to FIG. 3C, a third example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The third example conversation may be similar to the first example conversation and/or second example conversation in that the first conversation portion 308a is the same in each example conversation. The third example conversation differs from the previous example conversations in that the newly received customer message 312 is received in relatively close temporal proximity with messages of the first portion of the conversation 308a. In the example, the newly received customer message 312 is received within an hour of the previous customer message 312, suggesting that the newly received customer message 312 is continuing the conversation from the first portion of the conversation 308. However, the content of the newly received customer message 312 may not be closely associated with any particular topic. In other words, the content of the newly received customer message 312 may not receive a topic classification with a confidence score exceeding a predetermined threshold since the comment "Thank you!" is not likely determinable with respect to a particular topic.

In this instance, the chatbot engine 148 may utilize the metadata analysis to determine that the newly received customer message 312 is associated with the topic of the previous customer message 312. Additionally, since the content analysis of the newly received customer message 312 may be non-determinable with respect to topic, the chatbot engine 148 may determine (or assume) that the newly received customer message 312 is more likely than not still associated with the previous conversation. Additionally, the simple content of "Thank you!" suggests that the chatbot engine 148 could prepare a generic and form agent response 316 of something like, "You are welcome!" to conclude the conversation.

Figure 3D:
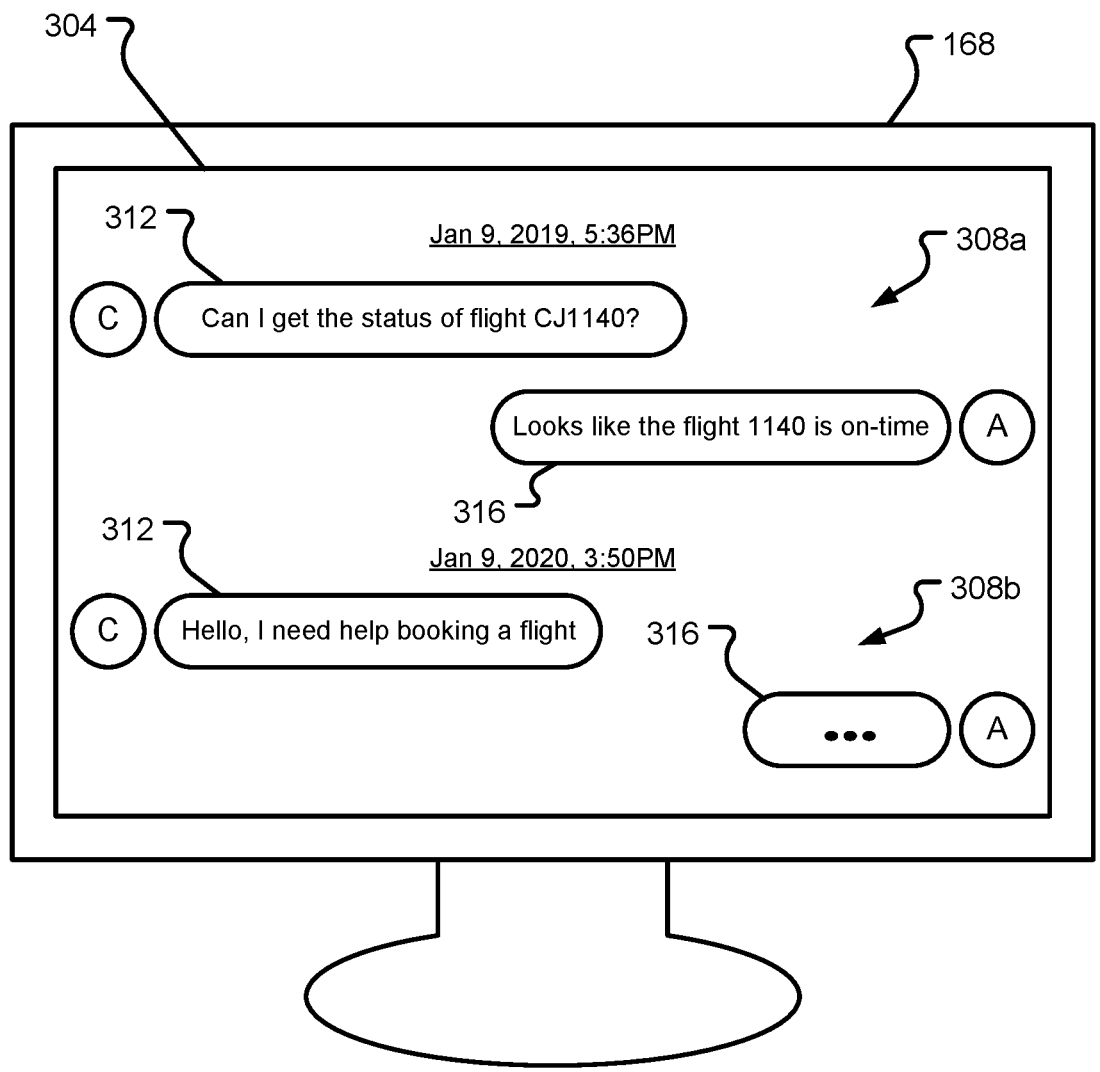
FIG. 3D is a screen shot depicting a graphical user interface of an agent communication device displaying a fourth conversation in accordance with at least some embodiments of the present disclosure.

Referring now to FIG. 3D, a fourth example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The fourth example conversation may be similar to previous example conversations in that the first conversation portion 308a is the same as in other example conversations. However, the fourth example conversation differs from previous example conversations in that the newly received customer message 312 is received a year after receiving a previous customer message 312. Additionally, the content of the newly received customer message 312 is different in the fourth example as compared to other examples. In the fourth example, the newly received customer message 312 indicates a desire for help with booking a flight. In this example, the metadata associated with the newly received customer message 312 as well as the content of the newly received customer message 312 may allow the chatbot engine 148 to determine that a new topic is being started (e.g., "flight reservation" as compared to "flight status"). This determination may be made with a relatively high confidence score, especially if the content analysis results in a confidence score for the topic of "flight reservation" above a predetermined threshold. However, even if the content analysis does not provide a confidence score above the predetermined threshold, the additional information provided by the metadata analysis may increase the likelihood that the chatbot engine 148 is able to provide an appropriate agent response 316 to the customer 116. With the information obtained via content and metadata analysis, the chatbot engine 148 may prepare an agent response 316 related to progressing a flight reservation dialog rather than progressing the previous dialog related to flight status.

Figure 3E:
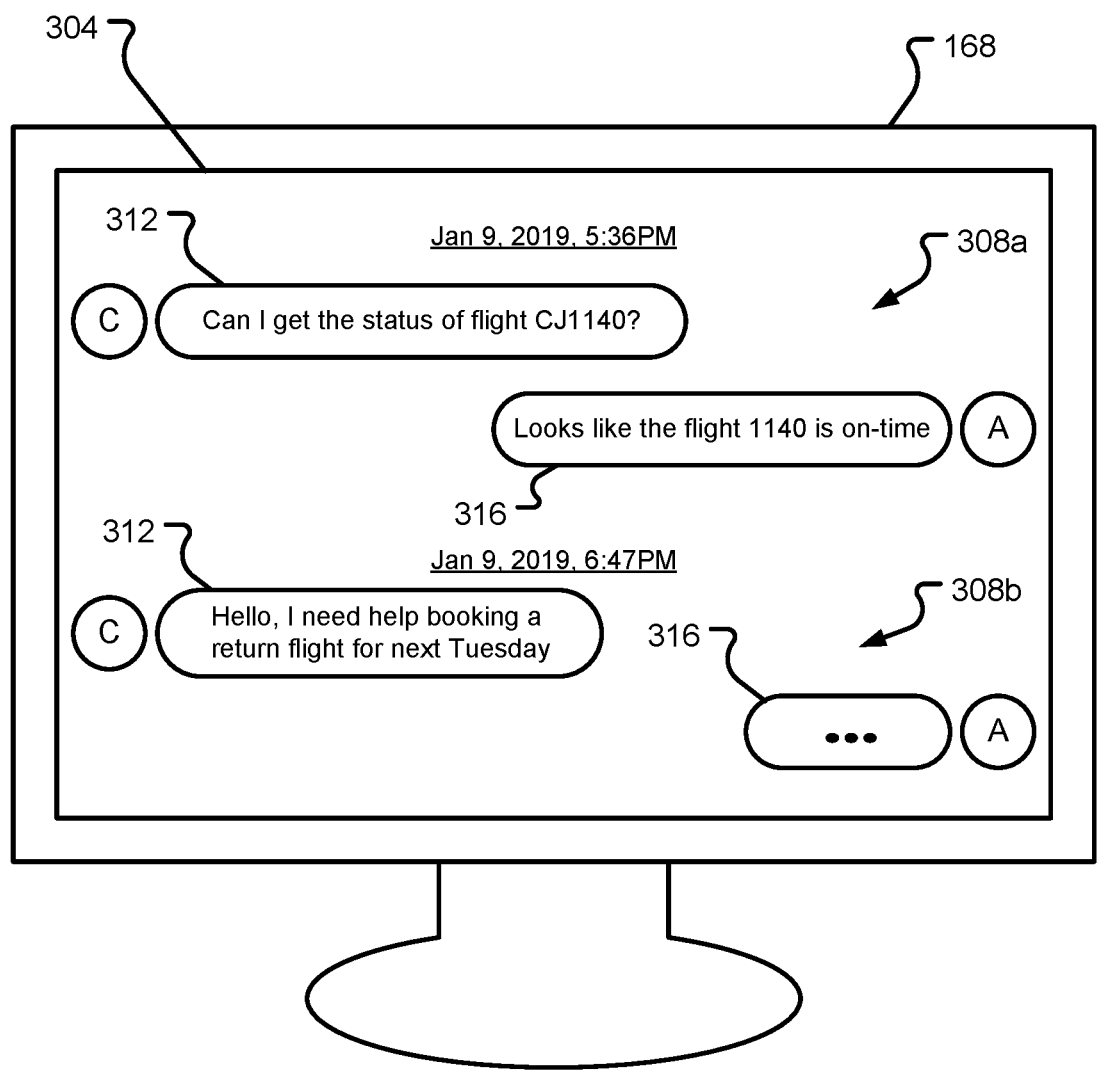
FIG. 3E is a screen shot depicting a graphical user interface of an agent communication device displaying a fifth conversation in accordance with at least some embodiments of the present disclosure.

Referring now to FIG. 3E, a fifth example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The fifth example conversation may be similar to other example conversations in that the first conversation portion 308a is the same in these example conversations. However, the fifth example conversation differs from previous example conversations in that the newly received customer message 312 is received in close temporal proximity (e.g., on the same day) to receiving a previous customer message 312. This close temporal proximity will suggest, based on metadata analysis, that the newly received customer message 312 is associated with the same topic as previous customer messages 312. However, the content of the newly received customer message 312 may indicate that the newly received customer message is associated with a new topic and deserves a new dialog. Specifically, the newly received customer message 312 may be determined to have a topic classification associated with "flight reservation" whereas the previously received customer message 312 had a topic classification associated with "flight status." If the chatbot engine 148 determines, based on content analysis, that the newly received customer message 312 is associated with a new topic classification and that determination is supported by a confidence score meeting or exceeding a predetermined threshold, then the chatbot engine 148 may ignore the results of the metadata analysis and prepare an agent response 316 for the new topic of "flight reservation" instead of the topic of "flight status."

Figure 3F:
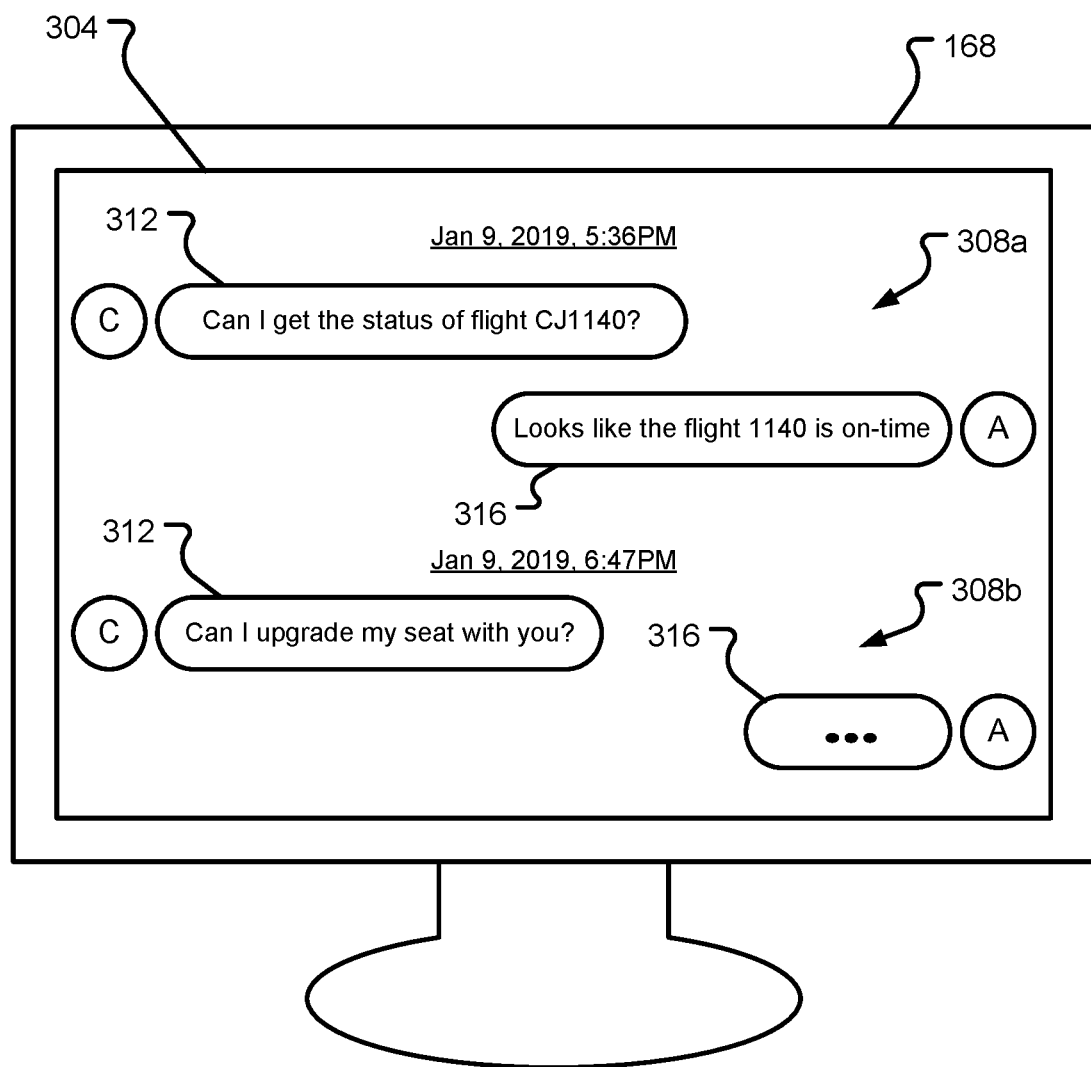
FIG. 3F is a screen shot depicting a graphical user interface of an agent communication device displaying a sixth conversation in accordance with at least some embodiments of the present disclosure.

Referring now to FIG. 3F, a sixth example conversation is shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The sixth example conversation may be similar to other example conversations in that the first conversation portion 308a is the same in these example conversations. However, the sixth example conversation differs from previous example conversations in that the newly received customer message 312 is received in close temporal proximity (e.g., on the same day) to receiving a previous customer message 312, but includes content suggesting a different topic than previously received customer messages 312. So, much like the fifth example conversation, the chatbot engine 148 in this example conversation may need to weigh its content analysis with its metadata analysis. In this example conversation, the chatbot engine 148 may determine the newly received customer message 312 is associated with the topic of "upgrade" whereas the previously received customer message 312 is associated with the topic of "flight status." So, in a similar manner to the fifth example conversation, the chatbot engine 148 may determine a new topic of conversation should be followed. However, in this example, the chatbot engine 148 may rely on information from previously received customer messages to generate an appropriate agent response 316. Specifically, the agent response 316 may be designed to address the new topic of "upgrade", but may utilize an entity value (e.g., flight number CJ1140) obtained from a previously received customer message 312. Thus, in this example, the agent response 316 may begin a discussion of the new topic, but may utilize information from messages exchanged on the previous topic of flight status. In this way, the second portion of the conversation 308*b* may be considered to be related to the first portion of the conversation 308*a* although the portions are related to different topics.

Figure 4A:
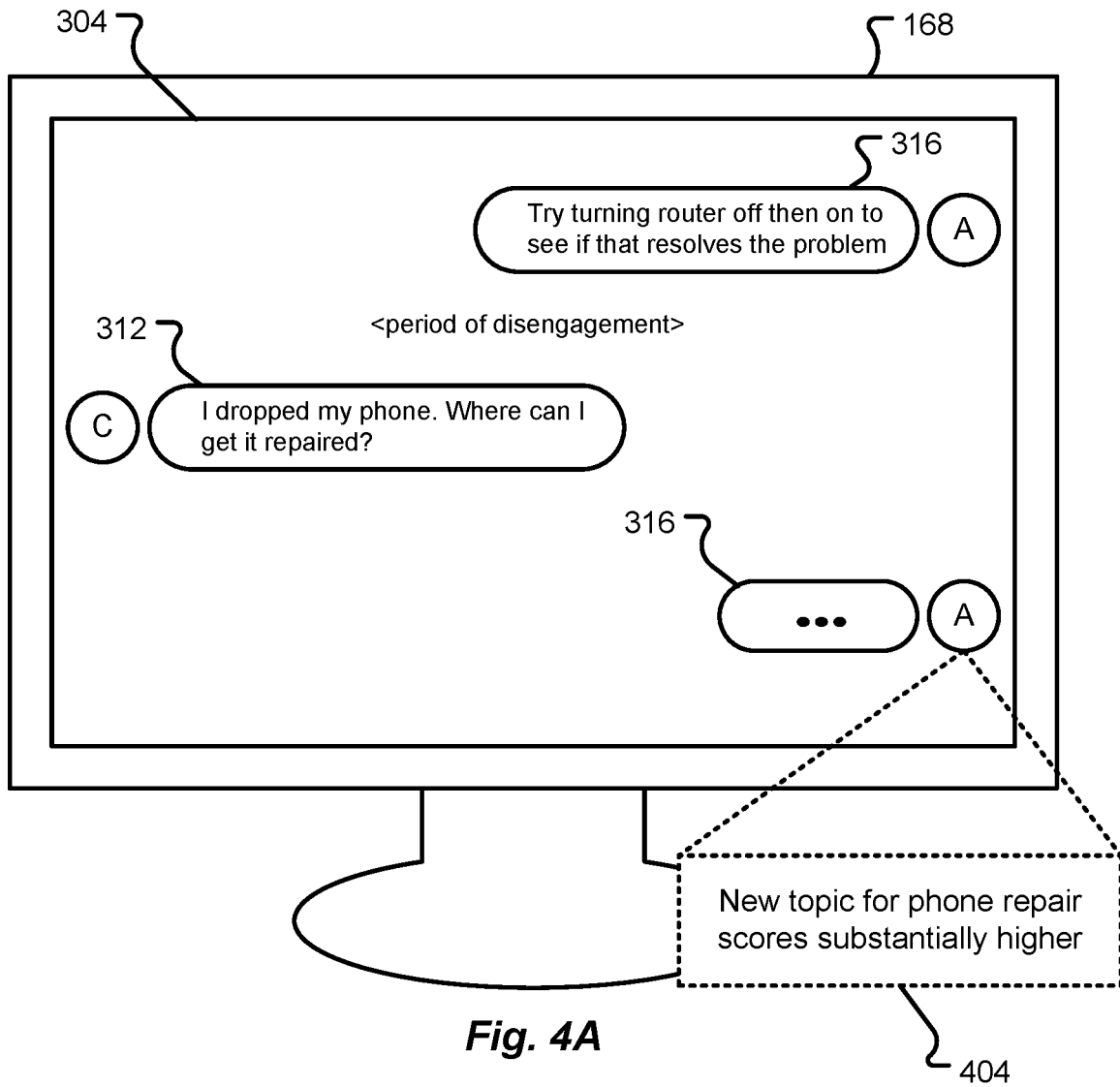
FIG. 4A is a screen shot depicting a graphical user interface of an agent communication device providing an indication of a new topic in the conversation with a customer in accordance with at least some embodiments of the present disclosure.
Figure 4B:
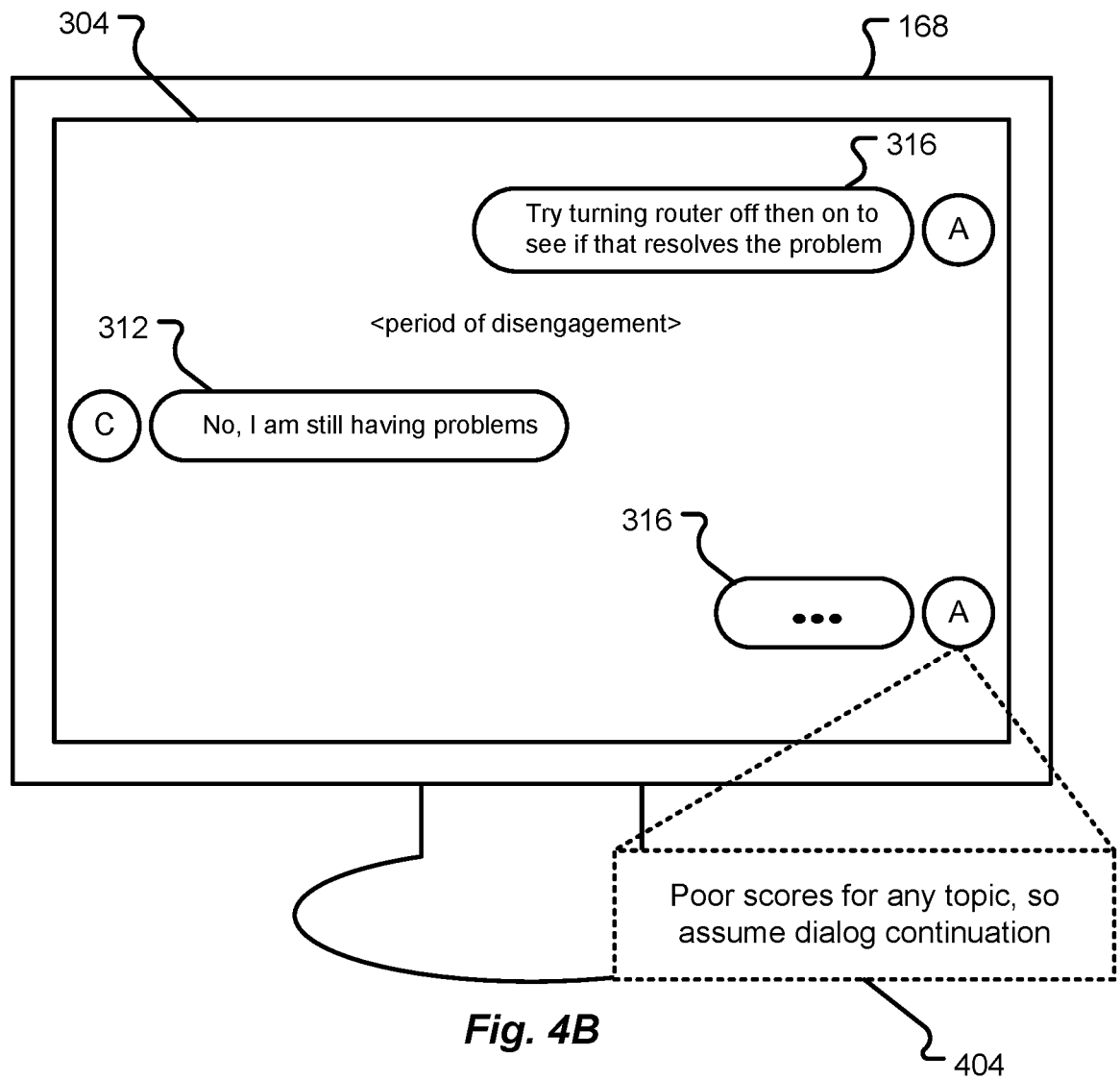
FIG. 4B is a screen shot depicting a graphical user interface of an agent communication device providing an indication of a topic continuation in the conversation with a customer in accordance with at least some embodiments of the present disclosure.

Referring now to FIGS. 4A and 4B, more example conversations are shown in which a customer 116 "C" is interacting with a contact center 108 over a digital communication channel (e.g., a chat communication channel). It should be appreciated that this communication channel could correspond to any type of asynchronous communication channel and does not necessarily need to correspond to a communication channel that is accessed via a chat application.

The example shown in FIG. 4A is different from previously described examples, but further show how a chatbot engine 148 may be configured to assist with a discussion of a different topic even though a newly received customer message 312 is incorporated on a same conversation and communication channel as previous messages. Additionally, FIG. 4A illustrates an example of providing an indicator 404 related to topic determination. The indicator 404 provided via the graphical user interface 304 may correspond to one example of an indicator 404. In the depicted embodiment, the indicator may include a note for a human agent 172, where the note is generated by the chatbot engine 148 based on a content and/or metadata analysis of the newly received customer message 312.

In the depicted example, the conversation between customer 116 and agent initially relates to a router troubleshooting topic. However, the newly received customer message 312 appears to have content indicating a different topic classification of phone repair. Based on a content analysis of the newly received customer message 312, the chatbot engine 148 may generate a proposed agent response 316 to be reviewed/approved/edited by a human agent 172. In addition to providing the proposed agent response 316, the chatbot engine 148 may also provide the indication 404 to the human agent's 172 communication device 168 that indicates a result of determining whether the topic classification determined for the newly received customer message 312 corresponds to the continuation of the topic classification for previously-exchanged messages or whether the topic classification determined for the newly received customer message 312 message corresponds to the different topic classification than the topic classification for the previously-exchanged messages.

In the example of FIG. 4A, the indication 404 shows a new topic classification whereas the example conversation of FIG. 4B shows that the indication includes a note related to the topic classification determination (or lack thereof) for the newly received customer message 312. The indication 404 also includes a note that no topic was determined with at least a predetermined confidence score. This information may quickly assist a human agent 172 in determining whether a proposed agent response 316 prepared by the chatbot engine 148 is appropriate given the context of the conversation.

It should be appreciated that the indication 404 can be configured to include textual comments prepared by the chatbot engine 148. Alternatively or additionally, the indication 404 may include visual or audible indications that are readily apparent to an agent. For instance, the indication 404 may simply include changing the color/font type/font size/border/presentation of the proposed agent response 316 based on whether the newly received customer message 312 is associated with the same or different topic. As discussed in other examples, the example of FIG. 4B depicts a newly received customer response 312 that does not score well for any particular topic, so the chatbot engine 148 may be configured to assume a dialog continuation on the previous topic of router troubleshooting. In this example, the agent response 316 may be related to the previous topic, but may include content that tries to progress the dialog in a different way (e.g., by asking different questions, by restating previous messages in a different way, etc.).

While the example(s) described in connection with FIGS. 4A and 4B relate primarily to detecting topic changes and providing notifications, it should be appreciated that embodiments of the present disclosure can configure a contact center 108 to respond in many different ways to detecting a change in topic. As a non-limiting example, embodiments provided herein are not only concerned with the ability to detect a topic change, but also aim to provide an opportunity to either route the conversation to a different agent with skills better suited for the new topic or to return the customer 116 to an automated experience with a chatbot engine 148 with the new topic. The examples of FIGS. 4A and 4B relate to generating a notification, but other embodiments contemplate transferring the conversation to a different agent or returning the customer 116 to a chatbot engine 148. The mechanism behind this is that when the customer 116 has been determined to have disengaged, for example, the first customer message received is evaluated by the chatbot engine 148 to determine the topic remains the same or has changed. If it has changed, then the contact center 108 logic can decide if the current agent 172 should continue, the conversation should be sent to a different agent 172, or the customer's 116 message should be processed by the chatbot and an automated dialog used in place of a human agent. It also implies that even when a conversation is between a human agent and a customer, the customer messages should be monitored, and a topic generated for that dialog. This could be done as the conversation progresses, it could be done AFTER a disengagement has been identified, or it could be done when the first customer message arrives after the disengagement was declared. The latter case may prompt a review of the prior dialog to generate the last topic of conversation prior to the disengagement.

Figure 5:
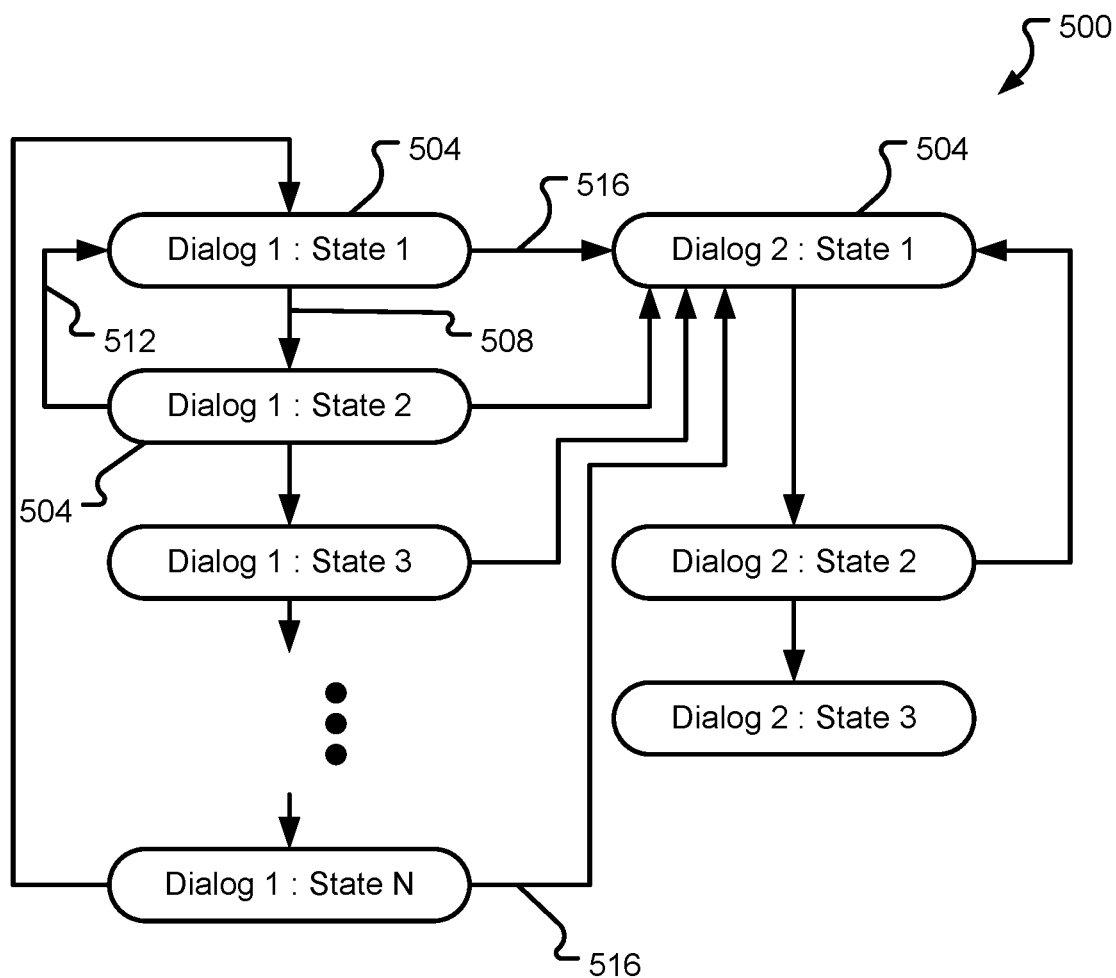
FIG. 5 is a state diagram depicting transitions between dialog states in accordance with at least some embodiments of the present disclosure.

With reference now to FIG. 5, additional information regarding conversation states 152 will be described in accordance with at least some embodiments of the present disclosure. It should be appreciated that the state information for conversation may be stored as conversation states 152 and may be managed by the combined efforts of the chatbot engine 148 and dialog engine 164.

FIG. 5 illustrates an example state diagram 500 in which multiple conversation states 152 are possible. Specifically, the state diagram 500 includes a depiction of individual dialog states, where each dialog may be considered related to a particular topic. In other words, different states 504 of any given dialog may correspond to a progression of a dialog on a particular topic. It can be seen that advancing state transitions 508 may progress a dialog on a particular topic. This generally occurs when the chatbot engine 148 determines a newly received customer message 312 has the same topic as a previously received customer message 312 and/or a newly received customer message 312 does not score well for any particular topic. FIG. 5 also illustrates that a dialog on a topic may have a regressing state transition 512 if it is later determined that a state transition was advanced prematurely.

In addition to having the ability to move between states for a particular dialog, there is also the ability to have an inter-dialog state transition 516. Use of the inter-dialog state transition 516 may occur when a newly received customer message 312 is determined, with a particular confidence score, to be associated with a new topic or different topic from the previously received customer messages 312. Providing the ability to transition between different dialog types enables the chatbot engine 148 to facilitate interactions with a customer 116 an asynchronous communication channel that is likely to contain message exchanges on different topics over time.

With reference now to FIGS. 6-22, various methods will be described in accordance with at least some embodiments of the present disclosure. The methods depicted and described herein may be performed by any of the components depicted and described herein. Additionally, it should be appreciated that any step of any method may be combined with any step of any other method and they may be combined in any order. Further still, it should be appreciated that the depicted order of steps in any particular method is for purposes of conversation and should not be construed as limiting the claims to any particular order of operations. Rather, methods contemplated herein may include any combination of steps from any method, performed in any order.

Figure 6:
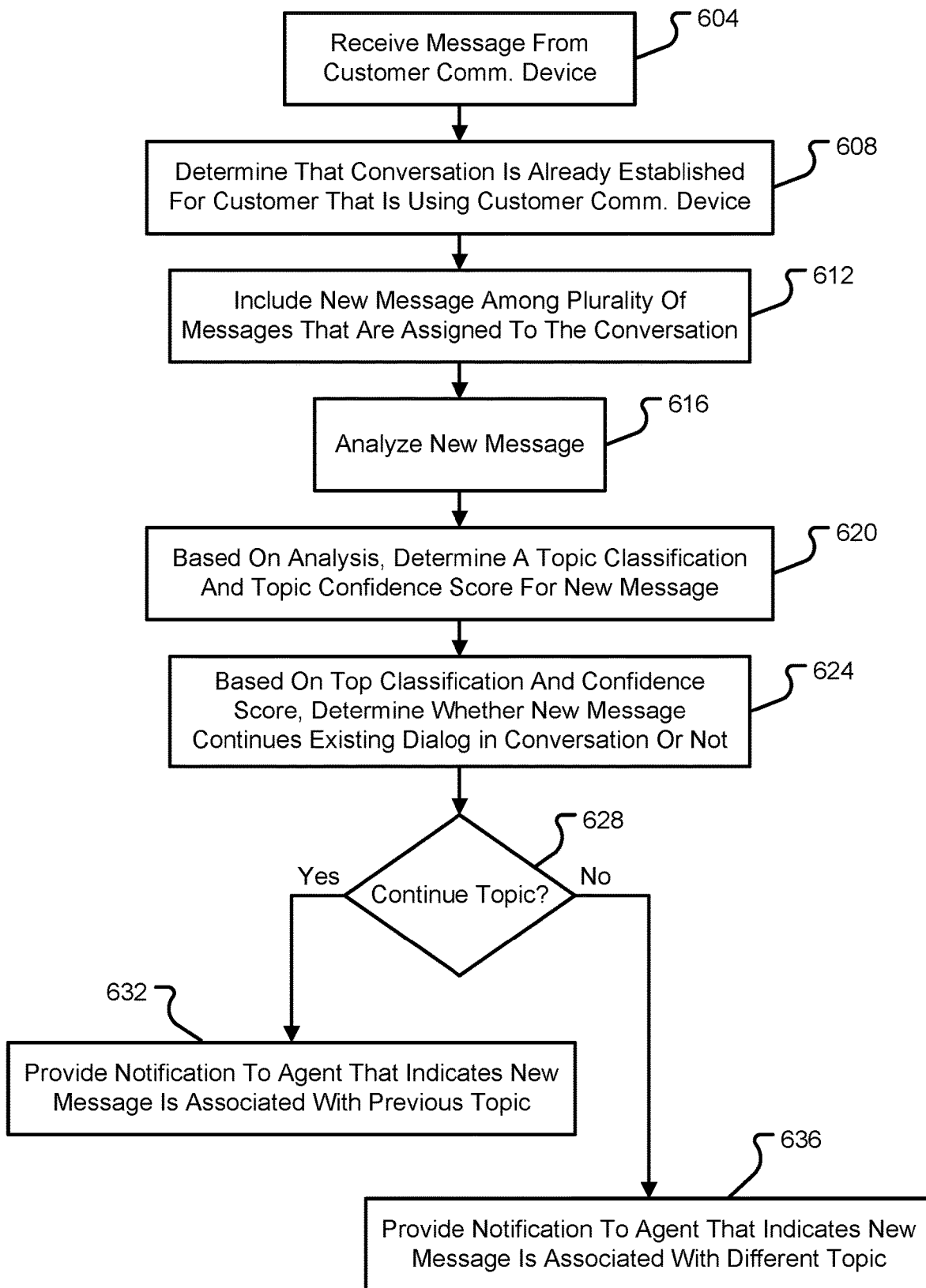
FIG. 6 is a flow diagram depicting a first communication method in accordance with at least some embodiments of the present disclosure.

Referring now to FIG. 6, a first communication method will be described in accordance with at least some embodiments of the present disclosure. The method begins when a message is received from a customer communication device 112 in a contact center 108 (step 604). The message may be referred to as a customer message 312.

The method continues with the routing engine 124 and communication server 128 determining that the customer message 312 is received on a communication channel that was previously established for/by the customer 116. In other words, the method progresses by determining that the newly received customer message 312 is received for a conversation and on a communication channel that was previously being used by the customer 116 (step 608).

Thereafter, the method continues with the communication server 128 including the newly received customer message 312 on the communication channel, thereby causing the customer message 312 to be presented in the conversation among other messages previously exchanged on the same communication channel (step 612). The method then progresses with the chatbot engine 148 analyzing the newly received customer message 312 (step 616). As discussed above, the analysis may include a content analysis of the customer message 312 as well as a metadata analysis of the customer message 312.

Based on the analysis, the chatbot engine 148 may determine a topic classification and topic confidence score for the newly received customer message 312 (step 620). As discussed above, the determination of topic classification and topic confidence score may be based solely on content analysis, solely on metadata analysis, or a combination of content analysis and metadata analysis. Additionally, the content analysis performed by the chatbot engine 148 may include utilizing a plurality of different conversation models 156, each trained to determine whether content of a message corresponds to a particular topic and each trained to provide a confidence score for their determination with respect to the particular topic. The chatbot engine 148 may be configured to analyze the determinations for multiple topics and select a topic that received the highest confidence score. Alternatively, the chatbot engine 148 may determine that the message is indeterminable with respect to any particular topic because each topic was unable to receive a confidence score exceeding a predetermined threshold. In other words, the chatbot engine 148 may be configured to determine whether the newly received customer message 312 is: (1) associated with a new topic as compared to previous messages exchanged on the communication channel; (2) associated with the same topic as compared to previous messages exchanged on the communication channel; or (3) not associated with any topic (step 624).

The method will proceed based on the results of the chatbot engine's 148 analysis performed in step 624 (step 628). In particular, if the chatbot engine 148 determines that the newly received customer message 312 is associated with the same topic as previous messages or is not associated with any particular new topic, then the chatbot engine 148 may decide to continue the conversation on the previous topic. In this situation, the chatbot engine 148 may generate an appropriate agent response 316 that is committed automatically to the communication channel and transmitted to the customer communication device 112. Alternatively or additionally, the chatbot engine 148 may generate a suggested agent response 316 that is presented to a human agent 172 for approval/editing prior to being committed to the communication channel. In some embodiments, the chatbot engine 148 may also provide a notification or indication 404 to a human agent 172 indicating that the newly received customer message 312 is associated with the same topic as previous messages (step 632).

On the other hand, if the chatbot engine 148 determines that the newly received customer message 312 is associated with a new topic, then the method may proceed with the chatbot engine 148 preparing an appropriate agent response 316 for the new topic. The agent response 316 may be committed automatically to the communication channel or may be provided to a human agent 172 for approval/editing prior to commitment. In some embodiments, the chatbot engine 148 may also provide a notification or indication 404 to the human agent 172 indicating that the newly received customer message 312 is associated with a different topic than previous messages (step 636). Beyond using a simple notification to the agent 172 of the topic change, an alternative would be a notification to a centralized control logic (e.g., a contact center 108 controller or business rules engine) of the topic change and that entity would have the options of leaving the conversation with the current agent 172, sending the conversation to a new agent 172 with an appropriate skill for the new topic, or sending the conversation to a chatbot that has been designed to handle dialog on the new topic.

Figure 7:
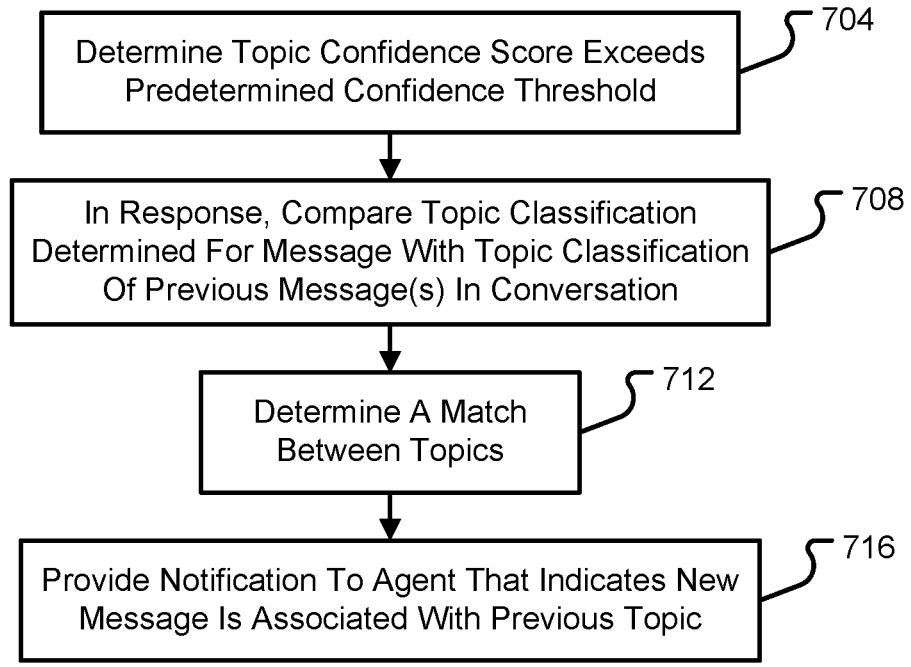
FIG. 7 is a flow diagram depicting a second communication method in accordance with at least some embodiments of the present disclosure.

Referring now to FIG. 7, a second communication method will be described in accordance with at least some embodiments of the present disclosure. The method begins with determining a topic confidence score exceeds a predetermined confidence threshold (step 704). The topic confidence score may be provided as an output of the chatbot engine 148 in response to providing content of a customer message 312 to a conversation model 156 (or artificial neural network in the form of a conversation model 156). The topic confidence score may be provided in any format (e.g., a percentage, a scalar value, etc.). The topic confidence score may be compared with a programmatically-defined confidence threshold (e.g., a static threshold) or a dynamic threshold that varies depending upon other variables (e.g., previous topic confidence scores, time of day, customer importance, topic, etc.).

In response to determining that the topic confidence score exceeds the predetermined confidence threshold, the method may continue with the chatbot engine 148 comparing the topic classification determined for the newly received customer message 312 with the topic classification of one or more previously received customer messages 312 in the same conversation (step 708). Based on the comparison, the chatbot engine 148 may determine that a match exists between the topic classification determined for the currently received customer message 312 and at least one of the previously received customer messages 312 (step 712). Based on determining such a match exists, the chatbot engine 148 may continue by providing a notification or indication 404 that indicates the newly received customer message 312 is associated with a topic assigned to a previously received customer message 312 (step 716). This notification or indication 404 may also provide an identification of the previously received customer message(s) 312 that have the shared topic (e.g., by highlighting the messages).

Figure 8:
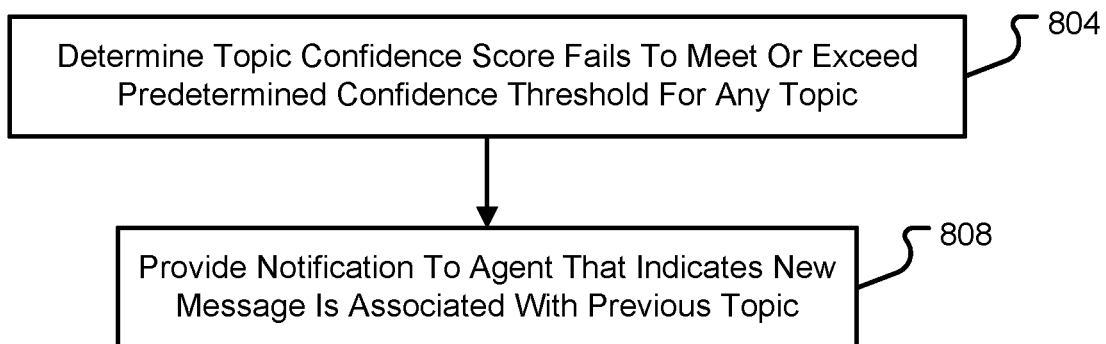
FIG. 8 is a flow diagram depicting a third communication method in accordance with at least some embodiments of the present disclosure.

Referring now to FIG. 8, another communication method will be described in accordance with at least some embodiments of the present disclosure. The method begins with the chatbot engine 148 analyzing a customer message 312 and determining that a topic confidence score for a topic (or for all possible topics) does not meet or exceed a predetermined confidence threshold (step 804). The predetermined confidence threshold used in this step may be the same as or different from the predetermined confidence threshold used in connection with step 704. That is to say, different predetermined confidence thresholds may be, but are not required to be, used in connection with determining a customer message 312 affirmatively should have a topic classification assigned thereto (as discussed in FIG. 7) as compared to determining a customer message 312 has no topic classification assigned thereto.

Upon determining that the customer message 312 did not have content sufficient to assign it a particular topic classification (e.g., based on the analysis of the confidence score), the method may continue with the chatbot engine 148 providing a notification or indication 404 to a human agent 172 that indicates the new customer message 312 is not associated with the previous topic (step 808).

Figure 9:
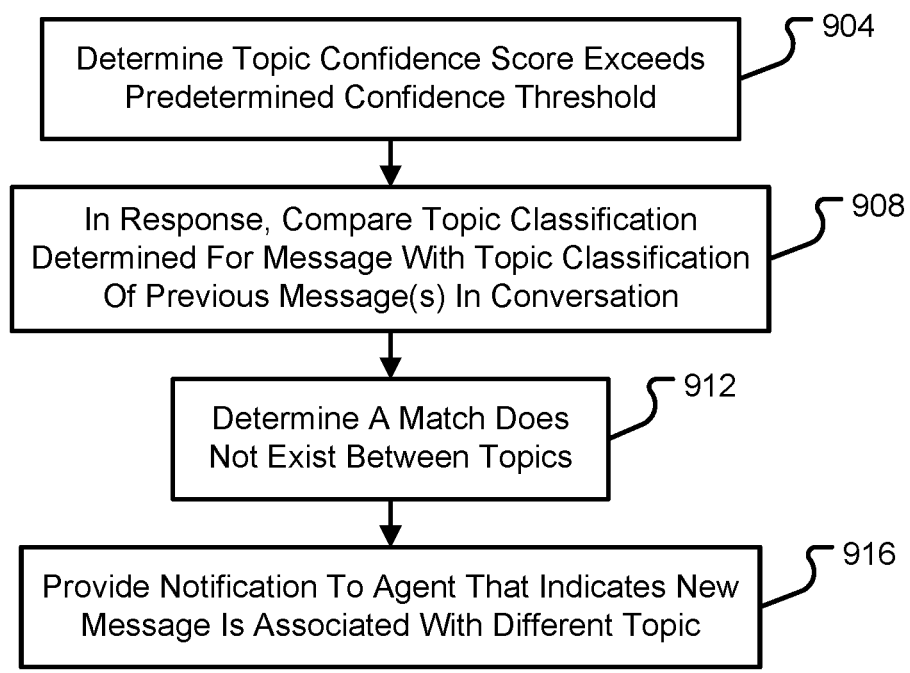
FIG. 9 is a flow diagram depicting a fourth communication method in accordance with at least some embodiments of the present disclosure.

Referring now to FIG. 9, yet another communication method will be described in accordance with at least some embodiments of the present disclosure. The method begins with a chatbot engine 148 determining that a customer message 312 has been determined to have a topic classification with a topic confidence score and further determining that the topic confidence score exceeds a predetermined confidence threshold (step 904). In response to determining that the topic confidence exceeds the predetermined confidence threshold, the method continues with the chatbot engine 148 comparing the topic classification determined for the newly received customer message 312 with a topic classification of one or more previously received customer messages 312 (step 908). The method may further continue with the chatbot engine 148 determining that a match does not exist between the topic classification of the newly received customer message 312 and one or more of the previously received customer messages 312 (step 912). In this step, the chatbot engine 148 may only compare the topic classification of the newly received customer message 312 with one previously received customer message 312 (e.g., the most recent previous customer message 312) or a number of previously received customer messages (e.g., a set of most recent previous customer messages 312 or messages received in the same day as the newly received customer message 312).

Based on determining that the newly received customer message 312 does not have the same topic classification assigned thereto as one or multiple previously received customer messages 312, the chatbot engine 148 may provide a notification or indication 404 to a human agent 172 that indicates the newly received customer message 312 is associated with a new or different topic than previously received customer messages 312.

Figure 10:
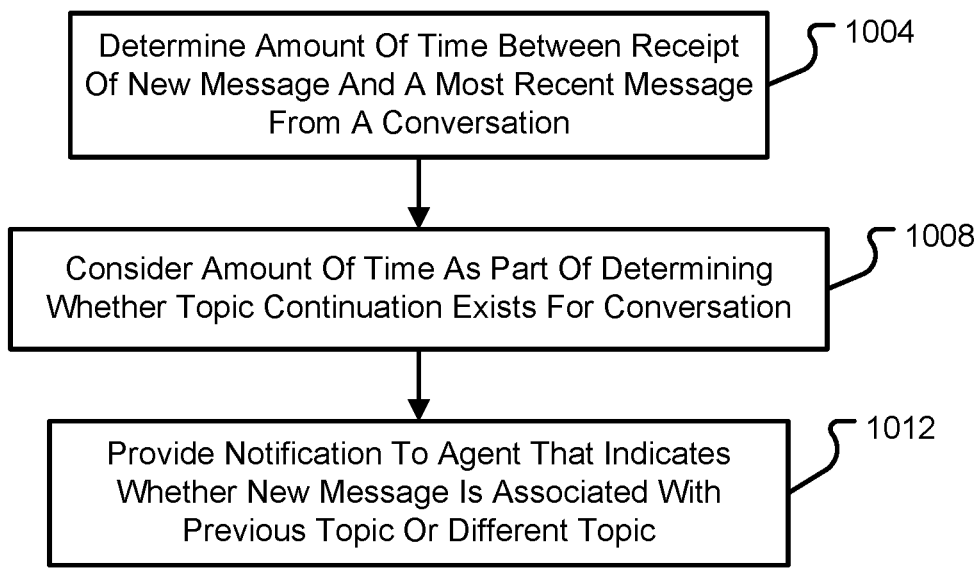
FIG. 10 is a flow diagram depicting a fifth communication method in accordance with at least some embodiments of the present disclosure.

Referring now to FIG. 10, another communication method will be described in accordance with at least some embodiments of the present disclosure. The method begins with the chatbot engine 148 determining an amount of time between receiving a newly received customer message 312 and receiving a previous customer message 312 (step 1004). The chatbot engine 148 may then be configured to consider the amount of time that elapsed between receiving the two message as part of determining whether a topic continuation exists for a conversation (step 1008). In other words, the chatbot engine 148 may be configured to perform a metadata analysis as part of determining whether a newly received message corresponds to a continued discussion of a previous topic or not.

Based on the metadata analysis performed in step 1008, alone or in combination with a content-based analysis of the newly received customer message 312, the chatbot engine 148 may then determine whether or not the newly received customer message 312 is associated with a previously discussed topic or a new/different topic. The chatbot engine 148 may then provide a notification or indication 404 to a human agent 172 that indicates whether the newly received customer message 312 is associated with a previously discussed topic or a new/different topic (step 1012).

Figure 11:
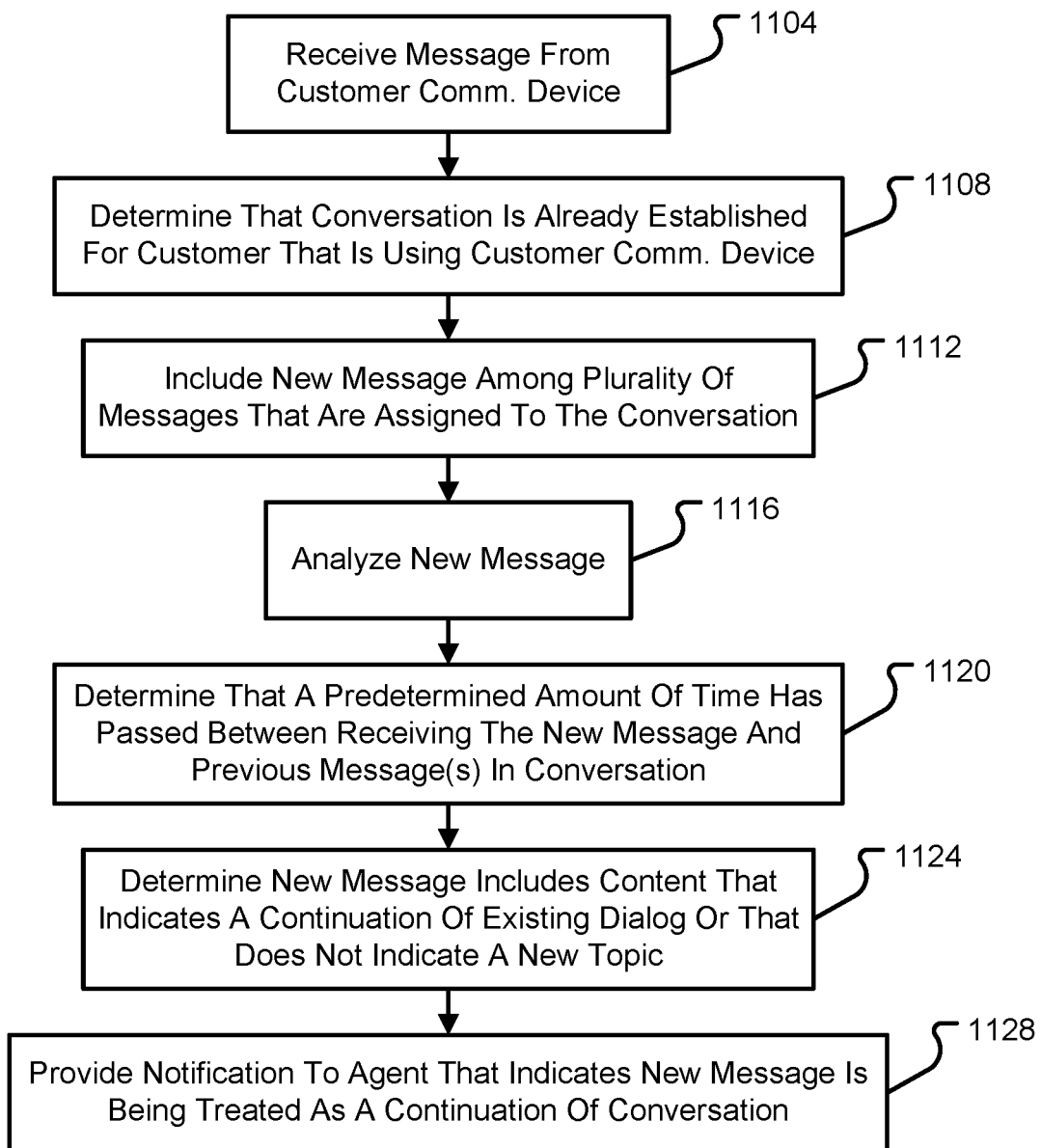
FIG. 11 is a flow diagram depicting a sixth communication method in accordance with at least some embodiments of the present disclosure.

Referring now to FIG. 11, another illustrative communication method will be described in accordance with at least some embodiments of the present disclosure. The method begins when a new message is received in the contact center 108 from a customer communication device 112 (step 1104). The method may then include determining that a conversation and communication channel is already established to enable the customer 116 that sent the message to communicate with the contact center 108 in an asynchronous fashion (step 1108).

The routing engine 124 and/or communication server 128 may then proceed by including the newly received customer message among other messages that are assigned to the customer's 116 conversation with the contact center 108 (step 1112). In other words, the newly received customer message 312 may be added to other messages that were previously exchanged between the same customer 116 and the contact center 108. As an example, the newly received customer message 312 may be added to a chat conversation that has been established and maintained by the contact center 108.

The method may further continue with the chatbot engine 148 analyzing the newly received customer message 312 (step 1116). In some embodiments, the analysis in this step may include a content analysis and metadata analysis for the newly received customer message 312. Based on the analysis, the chatbot engine 148 may determine that a predetermined amount of time has passed between receiving the newly received customer message 312 and a previous customer message 312 (step 1120). This determination may correspond to a determination made based on a metadata analysis performed on the newly received customer message 312.

The method may also include the chatbot engine 148 determining that the newly received customer message 312 includes content that indicates a continuation of an existing dialog or that does not indicate with any amount of certainty/ confidence that the newly received customer message 312 is associated with a new topic (step 1124). This determination may correspond to a determination made based on a content analysis performed on the newly received customer message 312 and may have been facilitated by providing content of the newly received customer message 312 to a plurality of different conversation models 156. The determination of step 1124 may occur if none of the different conversation models 156 determine the message is associated with a particular topic or is unable to produce a confidence score that exceeds a predetermined confidence threshold.

Based on the determinations made in steps 1120 and 1124, the chatbot engine 148 may continue by providing a notification or indication 404 to a human agent 172 that indicates the newly received customer message 312 is being treated as a continuation of the conversation (e.g., that the newly received customer message 312 is still attempting to discuss a previous conversation topic) (step 1128).

Figure 12:
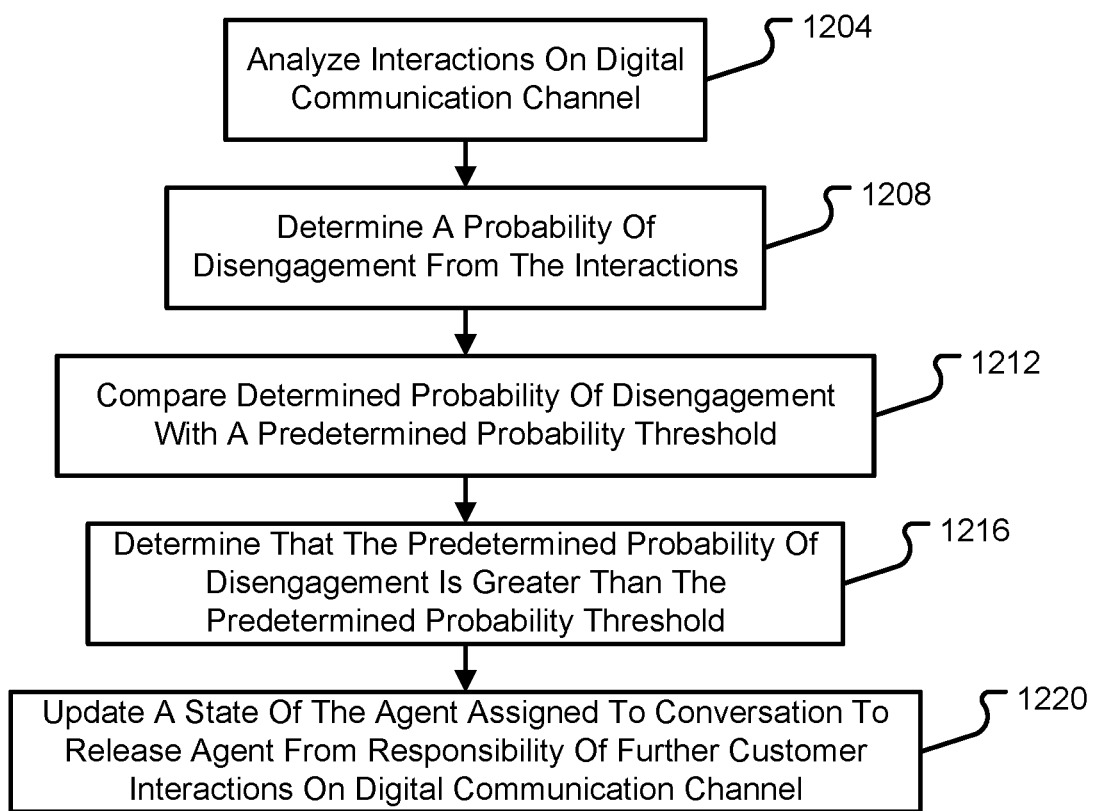
FIG. 12 is a flow diagram depicting a seventh communication method in accordance with at least some embodiments of the present disclosure.

Referring now to FIG. 12, another communication method will be described in accordance with at least some embodiments of the present disclosure. The method begins with a chatbot engine 148 analyzing interactions on a digital communication channel (step 1204). The digital communication channel may correspond to an asynchronous communication channel supported by the communication server 128.

The method may then continue with the chatbot engine 148 initiating a process of determining a probability of customer disengagement from a conversation (or conversation topic) based on content of the messages exchanged between the customer 116 and contact center 108. Specifically, the chatbot engine 148 may analyze content of some or all customer messages 312 received on the digital communication channel. In some embodiments, the chatbot engine 148 may determine a probability of disengagement from contact center 108 interactions based on a content analysis of the most recently received customer messages 312 (step 1208). The chatbot engine 148 may then compare the determined probability of disengagement with a predetermined probability threshold (step 1212).

If the probability of disengagement meets or exceeds the predetermined probability threshold (step 1216), then the chatbot engine 148 may determine that the customer 116 has likely disengaged from the conversation. In response to making such a determination, the chatbot engine 148 may continue by updating a state of one or more agents 172 assigned to the conversation (step 1220). In particular, the chatbot engine 148 and dialog engine 164 may update a conversation state 152 and may further inform the routing engine of the updated conversation state 152 (e.g., as an IDLE state). This may cause the routing engine to update a state of the human agent 172 assigned to the conversation to some different state (e.g., from a BUSY state to an AVAILABLE state), thereby releasing the agent 172 from responsibilities associated with responding to further customer messages 312 received from the customer 116.

Figure 13:
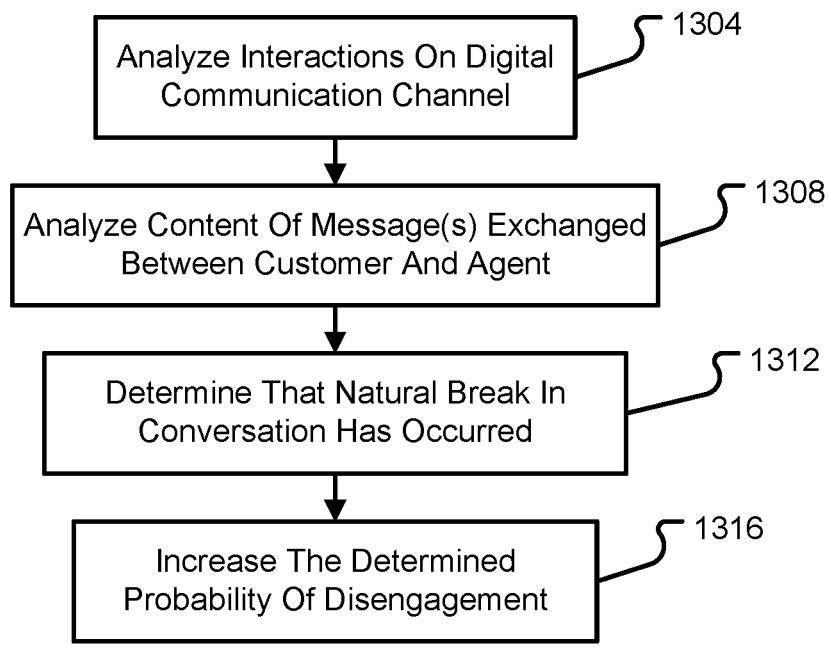
FIG. 13 is a flow diagram depicting an eighth communication method in accordance with at least some embodiments of the present disclosure.

With reference now to FIG. 13, another communication method will be described in accordance with at least some embodiments of the present disclosure. The method begins with a chatbot engine 148 analyzing interactions between a customer 116 and a contact center 108 on a digital communication channel (step 1304). The digital communication channel may correspond to an asynchronous communication channel that supports an exchange of text-based messages over an extended period of time (e.g., over multiple days or years).

The method may continue with the chatbot engine 148 analyzing content of messages exchanged between the customer 116 and an agent (step 1308). In this step, the chatbot engine 148 may analyze the content of customer messages 312, agent messages 316 produced and transmitted by an automated agent, agent messages 316 produced by an automated agent but approved by a human agent 172, and/or agent messages 316 produced by a human agent 172. Based on the analysis of the messages, the chatbot engine 148 may determine that a natural break in the conversation has occurred (step 1312). In response to determining that a natural break in the conversation has occurred, the chatbot engine 148 may increase a determined probability of customer disengagement from the conversation (step 1316).

Figure 14:
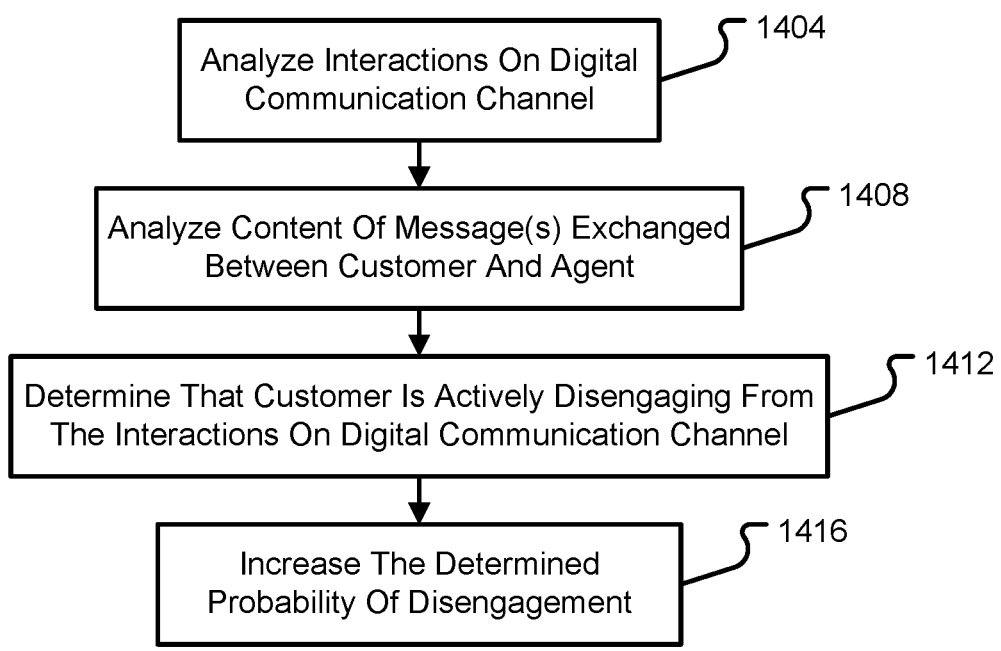
FIG. 14 is a flow diagram depicting a ninth communication method in accordance with at least some embodiments of the present disclosure.

With reference now to FIG. 14, yet another communication method will be described in accordance with at least some embodiments of the present disclosure. The method begins with a chatbot engine 148 analyzing interactions between a customer 116 and a contact center 108 on a digital communication channel (step 1404). This step may be similar or identical to step 1304 of FIG. 13. The digital communication channel may correspond to an asynchronous communication channel that supports an exchange of text-based messages over an extended period of time.

The method may continue with the chatbot engine 148 analyzing content of messages exchanged between the customer 116 and an agent (step 1408). Similar to step 1308 of FIG. 13, in this step the chatbot engine 148 may analyze the content of customer messages 312, agent messages 316 produced and transmitted by an automated agent, agent messages 316 produced by an automated agent but approved by a human agent 172, and/or agent messages 316 produced by a human agent 172.

Based on the analysis of the messages, the chatbot engine 148 may determine that the customer 116 is actively disengaging from the interactions (step 1412). As an example, one or more customer messages 312 may include content that indicates a dialog for a particular topic has progressed to a natural end (e.g., a final state) and the customer messages 312 may include salutations or other content indicating a natural disengagement from the conversation (e.g., "bye", "thank you", etc.). In response to determining that the customer is actively disengaging from the conversation, the chatbot engine 148 may increase a determined probability of customer disengagement from the conversation (step 1416).

Figure 15:
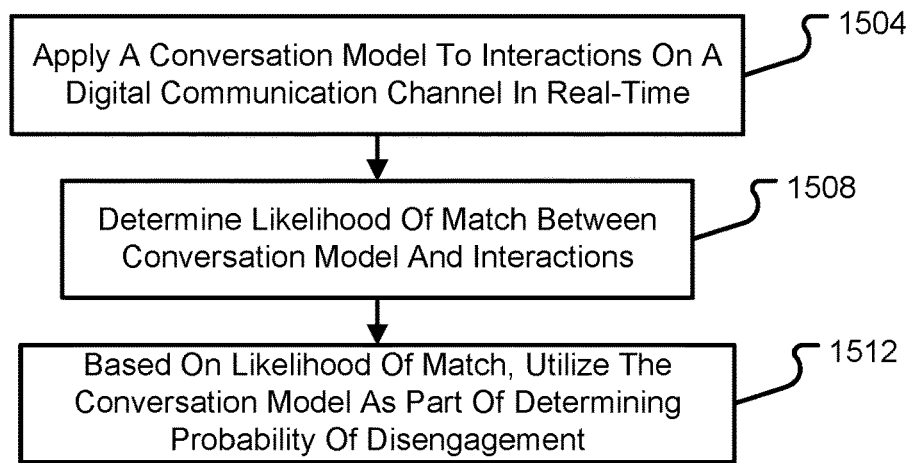
FIG. 15 is a flow diagram depicting a tenth communication method in accordance with at least some embodiments of the present disclosure.

Referring now to FIG. 15, another communication method will be described in accordance with at least some embodiments of the present disclosure. The method begins with the chatbot engine 148 applying a conversation model 156 to interactions exchanged over a digital communication channel (step 1504). In some embodiments, the content of interactions is applied to the conversation model(s) 156 as the content is exchanged. In other words, the chatbot engine 148 may be configured to analyze the content of messages exchanged over the digital communication channel in real-time.

Based on the analysis, the chatbot engine 148 may determine a likelihood of a match between a conversation model 156 trained to identify customer disengagement and interactions exchanged over the digital communication channel (step 1508). Based on the likelihood of a match between the conversation model 156 and the interactions occurring over the digital communication channel, the chatbot engine 148 may determine a probability of disengagement for the customer 116 (step 1512). In other words, if the conversation model 156 trained to identify customer disengagement determines, based on having the content of interactions applied thereto, that the customer is likely disengaging from the conversation (e.g., with at least a predetermined confidence score), the chatbot engine 148 may determine that there is a probability of customer disengagement from the conversation.

Figure 16:
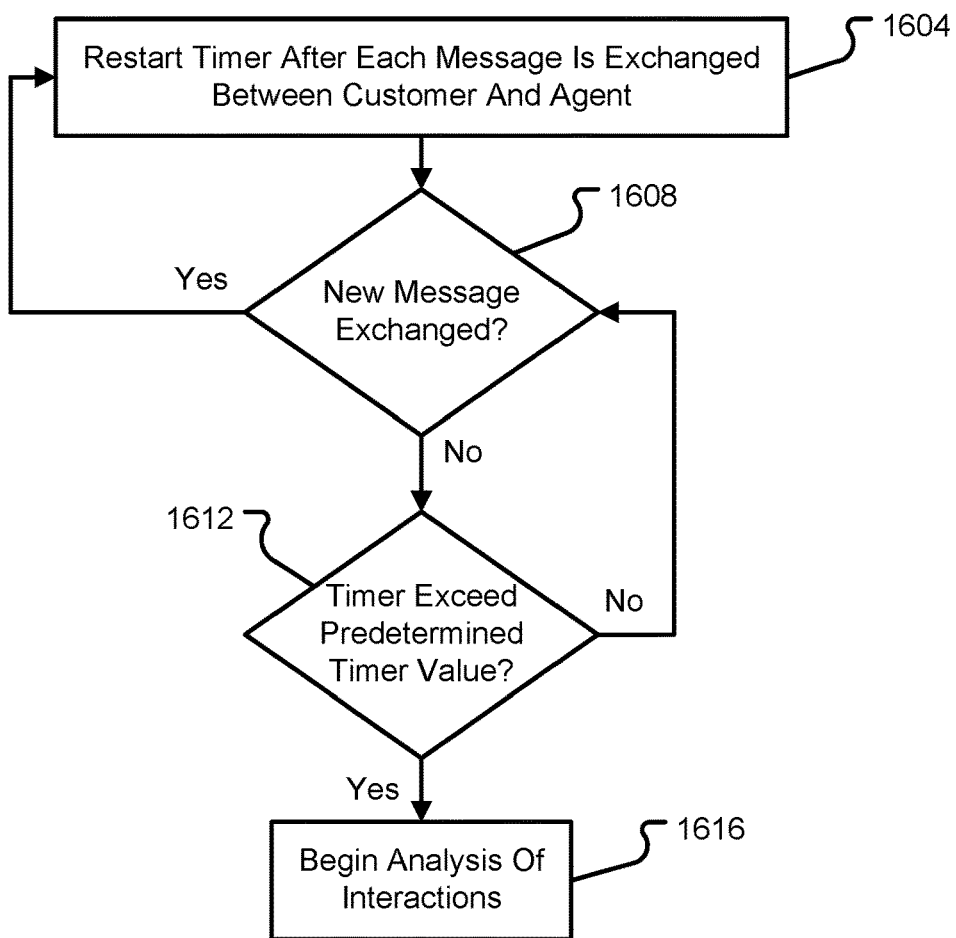
FIG. 16 is a flow diagram depicting an eleventh communication method in accordance with at least some embodiments of the present disclosure.

Referring now to FIG. 16, another communication method will be described in accordance with at least some embodiments of the present disclosure. The method begins with a chatbot engine 148 restarting a timer after each customer message 312 is received at the contact center 108 (step 1604). More specifically, the chatbot engine 148 may perform a portion of its metadata analysis by restarting a timer after each message is exchanged between the customer 116 and an agent (whether automated or human).

The method continues by determining whether a new message has been exchanged by either the customer 116 or agent (step 1608). If a new message has been exchanged, then the method returns to step 1604 and the timer is restarted. If the query of step 1608 is answered negatively, then the method proceeds by determining whether the current timer value exceeds a predetermined timer threshold (step 1612). If the query of step 1612 is answered negatively, then the method returns to step 1608.

If, on the other hand, the query of step 1612 is answered positively, then the method proceeds with the chatbot engine 148 initiating a process of analyzing interactions exchanged over the digital communication channel (step 1616). In particular, the analysis initiated in step 1616 may correspond to a content-based analysis of messages exchanged over the digital communication channel.

Figure 17:
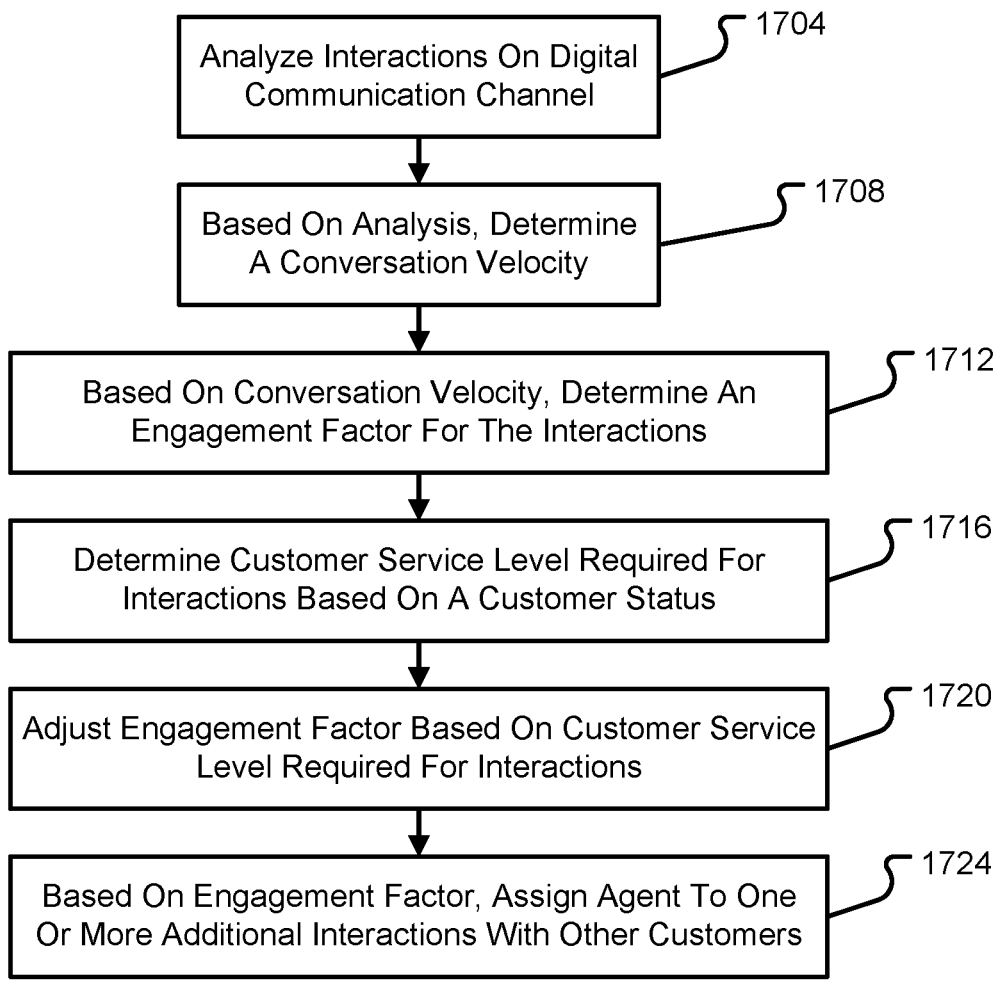
FIG. 17 is a flow diagram depicting a twelfth communication method in accordance with at least some embodiments of the present disclosure.

Referring now to FIG. 17, still another communication method will be described in accordance with at least some embodiments of the present disclosure. The method begins with the chatbot engine 148 and/or dialog engine 164 analyzing interactions on a digital communication channel (step 1704). Based on the analysis of the interactions, the chatbot engine 148 and/or dialog engine 164 may determine a conversation velocity for the conversation (step 1708). In some embodiments, a conversation velocity may refer to a speed or frequency with which messages are being exchanged over the communication channel, a speed or frequency with which customer messages 312 are being received, a speed or frequency with which agent messages 316 are being transmitted, a speed or frequency with which conversation states 152 are changing, a speed or frequency with which topics are changing during the conversation, or some combination thereof. The determination of a conversation velocity represents one way to measure or determine a customer's 116 level of engagement with the conversation. A relatively low conversation velocity represents a correspondingly low level of customer 116 engagement with the conversation whereas a relatively high conversation velocity represents a correspondingly high level of customer 116 engagement.

The method may continue with the chatbot engine 148 and/or dialog engine 164 determining a customer engagement factor for the interactions, based at least in part on the determined conversation velocity (step 1712). The method may further include the chatbot engine 148 and/or dialog engine 164 determining a customer service level required for interactions, based at least in part on the customer's 116 status (step 1716). As an example, a customer having a relatively higher status level (e.g., Platinum customer or Gold customer) may be entitled to certain additional service benefits from the contact center 108 than a customer not having the same status level. This may be particularly true if the customer having the higher status level paid/pays for the benefit of that status level. In some embodiments, a customer 116 having a relatively higher status level may be entitled to more interactions with a human agent 172 whereas a customer 116 having a relatively lower status level may be required to interact with a chatbot engine 148 for a longer period of time before being transferred to a human agent 172.

The method may then continue with the chatbot engine 148 and/or dialog engine 164 adjusting an engagement factor for the conversation based on the customer service level required for the interactions (step 1720). Based on this engagement factor, the method may continue with re-assigning one or more human agents 172 onto or away from the conversation (step 1724). The re-assignment may be implemented at the routing engine 124 by changing an agent state at the routing engine 124. In some embodiments, a human agent 172 that was previously assigned to the conversation may be assigned to other interactions with other customers if the conversation velocity is below a predetermined threshold and/or the customer service level does not require a human agent 172 at all times (e.g., as represented by the engagement factor). Conversely, a human agent 172 may be assigned to the conversation if the conversation velocity is above a predetermined threshold and/or the customer service level does require a human agent 172 (e.g., as represented by the engagement factor).

Figure 18:
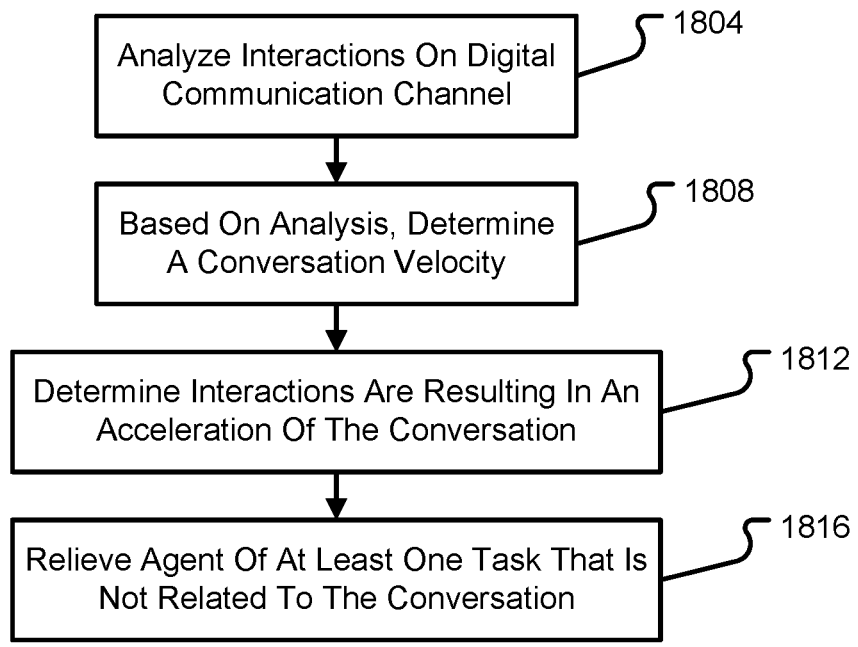
FIG. 18 is a flow diagram depicting a thirteenth communication method in accordance with at least some embodiments of the present disclosure.

Referring now to FIG. 18, another communication method will be described in accordance with at least some embodiments of the present disclosure. The method begins with a chatbot engine 148 and/or dialog engine 164 analyzing interactions on a digital communication channel (step 1804). The method may continue with the chatbot engine 148 and/or dialog engine 164 determining a conversation velocity for the interactions, based at least in part on the analysis performed in step 1804 (step 1808). It should be appreciated that the analysis and resulting determination of a conversation velocity may include metadata analysis as well as content analysis for the messages exchanged during an interaction.

The chatbot engine 148 and/or dialog engine 164, based on the determination of a conversation velocity, may determine that interactions in the conversation are resulting in an acceleration of the conversation (step 1812). In some embodiments, the determination that interactions are accelerating may be made by determining that a conversation velocity is increasing over a period of time. Specifically, an acceleration of the conversation may be represented as a positive change in the conversation velocity over a period of time.

Based on determining that the interactions are resulting in an acceleration of the conversation, the method may continue by relieving a human agent 172 already assigned to the conversation of at least one other task that is not related to the conversation (step 1816). As an example, if the human agent 172 were simultaneously assigned to seven (7) different chat interactions and the conversation velocity of one of the chat interactions is determined to be accelerating, then the human agent 172 may be unassigned from one, two, three, or more of the other different chat interactions, thereby allowing the human agent 172 to focus their attention on the chat interaction that is accelerating.

Figure 19:
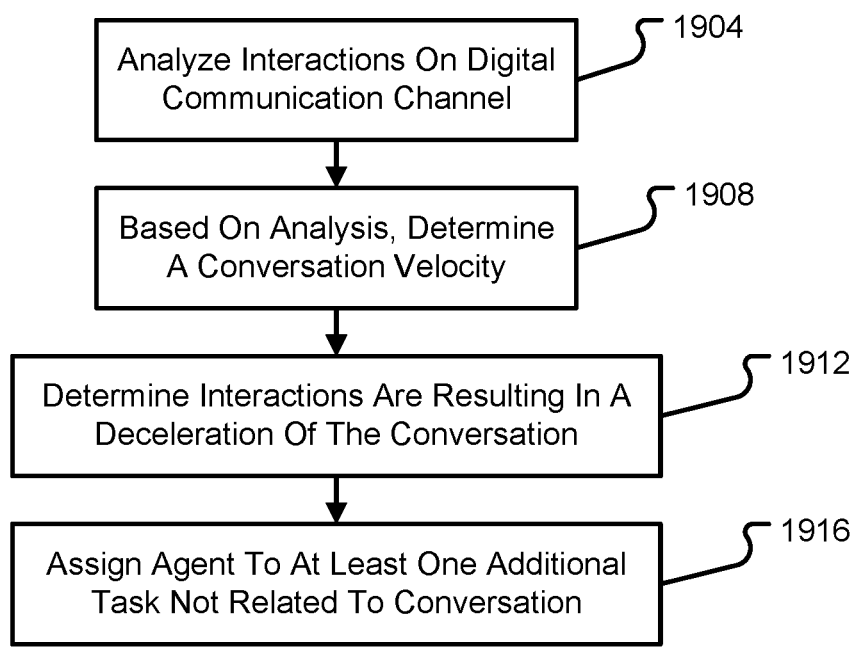
FIG. 19 is a flow diagram depicting a fourteenth communication method in accordance with at least some embodiments of the present disclosure.

Referring now to FIG. 19, another communication method will be described in accordance with at least some embodiments of the present disclosure. The method begins with a chatbot engine 148 and/or dialog engine 164 analyzing interactions on a digital communication channel (step 1904). The method may continue with the chatbot engine 148 and/or dialog engine 164 determining a conversation velocity for the interactions, based at least in part on the analysis performed in step 1904 (step 1908). It should be appreciated that the analysis and resulting determination of a conversation velocity may include metadata analysis as well as content analysis for the messages exchanged during an interaction.

The chatbot engine 148 and/or dialog engine 164, based on the determination of a conversation velocity, may determine that interactions in the conversation are resulting in a deceleration of the conversation (step 1912). In some embodiments, the determination that interactions are decelerating may be made by determining that a conversation velocity is decreasing over a period of time. Specifically, a deceleration of the conversation may be represented as a negative change in the conversation velocity over a period of time.

Based on determining that the interactions are resulting in a deceleration of the conversation, the method may continue by assigning a human agent 172 already assigned to the conversation to at least one additional task that is not related to the conversation (step 1916). As an example, if the human agent 172 were only assigned to two (2) different chat interactions and the conversation velocity of one of the chat interactions is determined to be decelerating, then the human agent 172 may be further assigned to one, two, three, or more additional chat interactions, thereby maximizing a utilization of the human agent 172.

Figure 20:
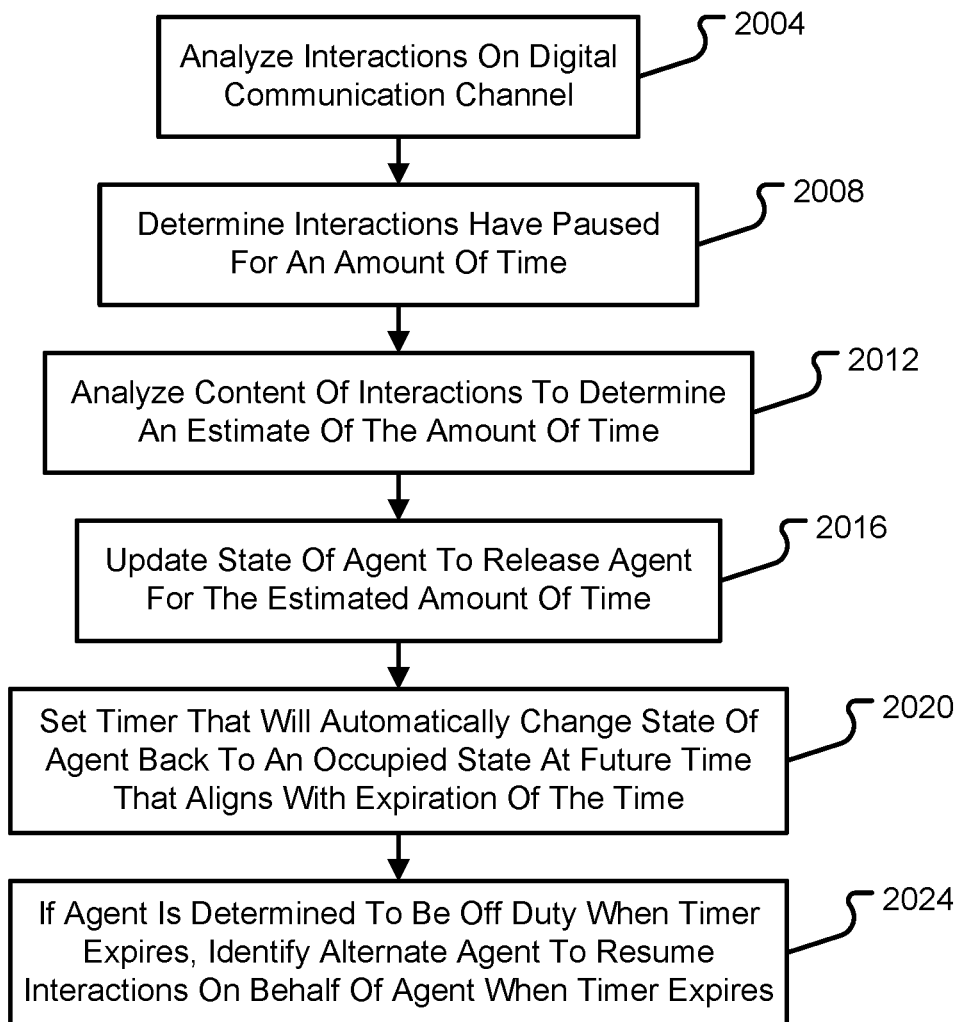
FIG. 20 is a flow diagram depicting a fifteenth communication method in accordance with at least some embodiments of the present disclosure.

Referring now to FIG. 20, still another communication method will be described in accordance with at least some embodiments of the present disclosure. The method begins with a chatbot engine 148 and/or dialog engine 164 analyzing interactions on a digital communication channel (step 2004). Based on the analysis, the chatbot engine 148 and/or dialog engine 164 may determine that interactions have paused for an amount of time or are about to pause for a future amount of time (step 2008). In some embodiments, this may include determining that no new customer messages 312 have been received for more than a predetermined amount of time. This step may also include determining that a natural break in a conversation has occurred based on analyzing content of messages exchanged during the interaction. As an example, if the customer messages 312 includes content saying something like, "Give me a minute, while I check" or "I will find out later tonight", the content suggests that the customer 116 has to leave the conversation to obtain additional information to progress the conversation. Such content found in a customer message 312 may provide an indication that a conversation is about to have a natural break or pause therein.

In response to determining that the interactions have paused, the method may continue with the chatbot engine 148 and/or dialog engine 164 analyzing a content of the interactions to determine an estimate for an additional amount of time that the interactions will be paused (step 2012). The estimate for the additional amount of time may be made based on a content analysis of the messages. Alternatively or additionally, the estimate for the additional amount of time may be made based on a processing of the interactions with a conversation model 156 that is trained to estimate an amount of time until a next customer message 312 is received based on previous interactions in a conversation.

The method may then continue by updating a state of a human agent 172 to release the agent for an amount of time that is equal to (or nearly equal to) to estimate for the additional amount of time as determined in step 2012 (step 2016). The state of the human agent 172, in some embodiments, may be changed from BUSY to AVAILABLE. Alternatively, the state of the human agent 172 may be changed to enable the human agent 172 to service additional other chat conversations (possibly multiple chat conversations) while maintaining responsibility for the current conversation that is experiencing a pause.

The method may further continue by setting a timer that, when expired, automatically changes the state of the human agent 172 back to an UNAVAILABLE/OCCUPIED/BUSY state with respect to the conversation (step 2020). In some embodiments, the timer may be set to a starting value that is equal to the estimate for the additional amount of time as determined in step 2012. The method may also include the ability to determine if the human agent 172 will be off duty (e.g., on a break or done working for the day) when the timer is set to expire. If it is determined that the human agent 172 will be off duty at or near the time at which the timer will expire, then the method may identify an alternate agent to resume interactions on behalf of the human agent 172 when the timer expires (step 2024). The alternate agent may also correspond to a human agent 172, but doesn't necessarily have to correspond to a human agent 172. The alternate agent, if a human agent 172, may correspond to a different person that is determined to likely be available and on duty when the timer expires.

Figure 21:
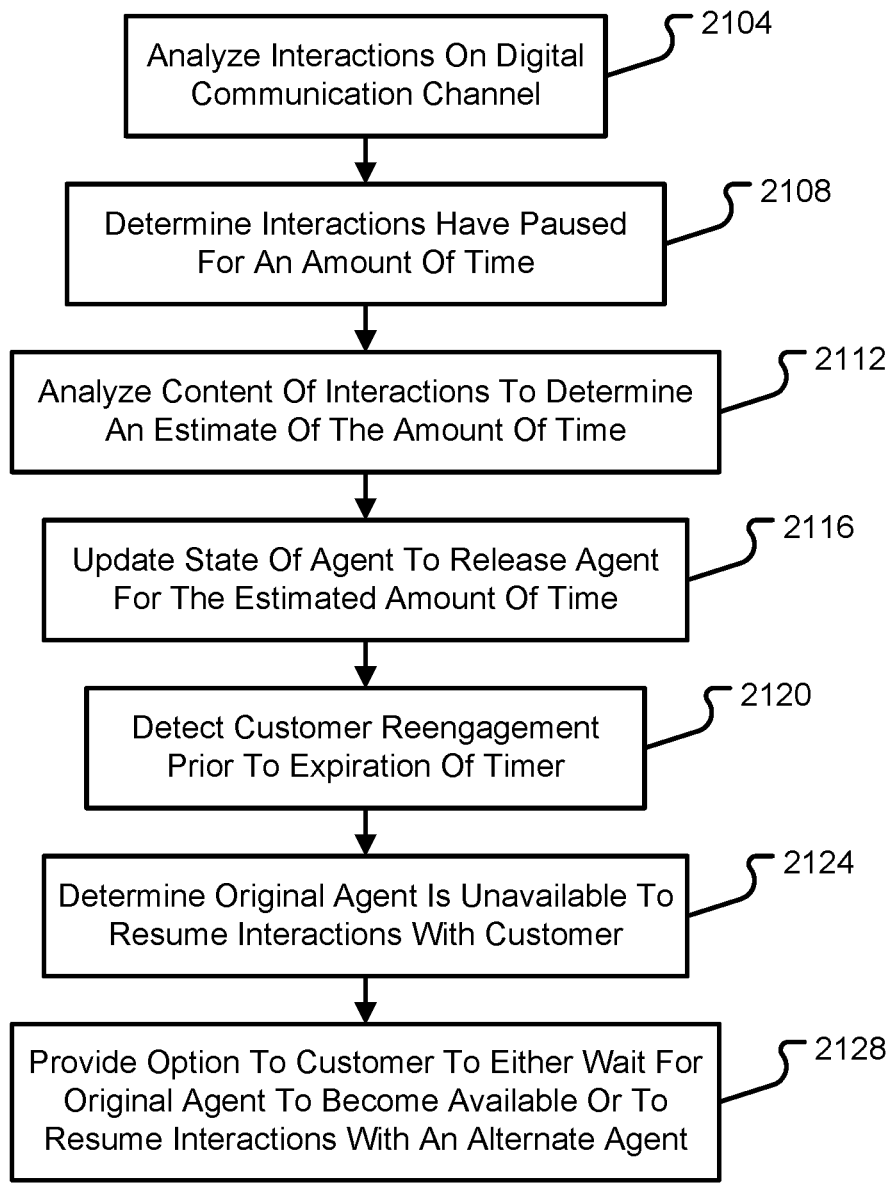
FIG. 21 is a flow diagram depicting a sixteenth communication method in accordance with at least some embodiments of the present disclosure.

Referring now to FIG. 21, another communication method will be described in accordance with at least some embodiments of the present disclosure. The method begins with a chatbot engine 148 and/or dialog engine 164 analyzing interactions on a digital communication channel (step 2104). The method then continues by determining that interactions have paused for an amount of time or are likely to pause for some amount of time in the future (step 2108).

In response to the determination of step 2108, the method may continue with the chatbot engine 148 and/or dialog engine 164 analyzing the content of interactions to determine an estimated amount of time for which the interactions will be paused (step 2112). The process of this step may be similar or identical to step 2012. Thereafter, the state of an agent 172 assigned to the conversation may be updated to release the agent 172 for an amount of time that is similar to or equal to the estimated amount of time (step 2116).

The method may then continue if customer 116 reengagement is detected prior to expiration of a timer that was set based on the estimated amount of time (step 2120). Customer 116 reengagement may be detected by receiving a new customer message 312 prior to the timer expired. If the original agent 172 handling the conversation is AVAILABLE, then the agent 172 may be reassigned back to the conversation. However, if the original agent 172 is determined to be UNAVAILABLE, BUSY, or OCCUPIED (step 2124), then the method may continue by providing an option to the customer 116 that allows the customer 116 to select whether they want to wait for the original agent 172 to become AVAILABLE or to resume interactions with an alternate agent (step 2128). The customer's 116 response may then control further actions of the contact center 108, including determining whether to wait for the original agent 172 and then reassign the original agent 172 back to the conversation or to assign an alternate agent to the conversation.

Figure 22:
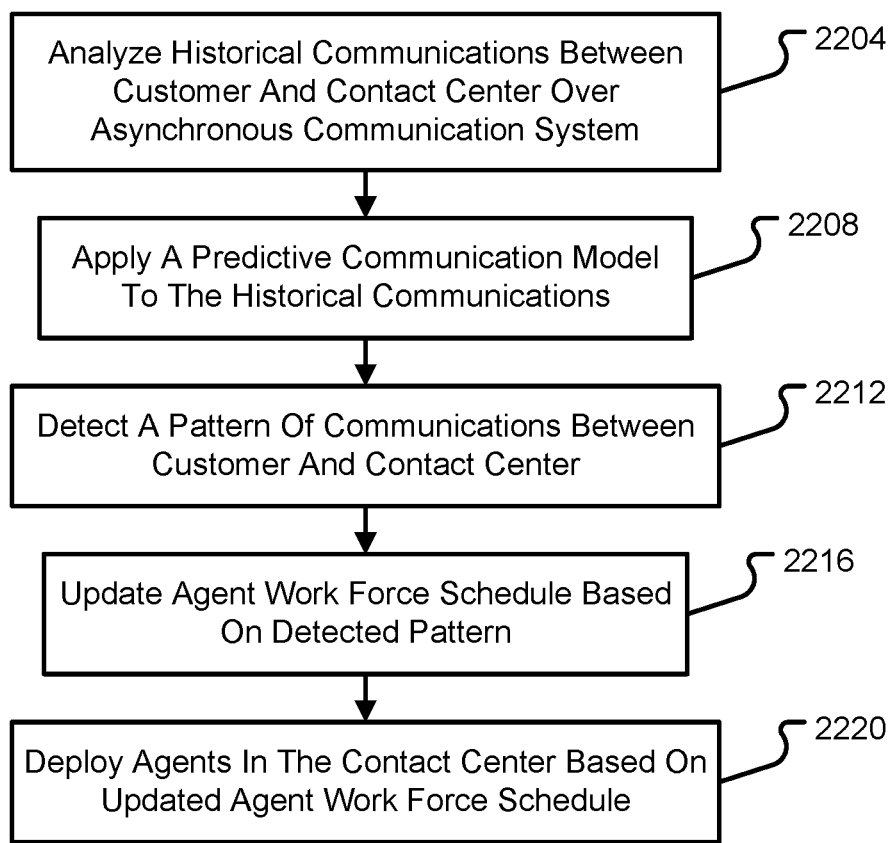
FIG. 22 is a flow diagram depicting a seventeenth communication method in accordance with at least some embodiments of the present disclosure.

With reference now to FIG. 22, another communication method will be described in accordance with at least some embodiments of the present disclosure. The method begins with a chatbot engine 148 and/or dialog engine 164 analyzing historical communications between a customer 116 and the contact center 108 over an asynchronous communication channel (step 2204). The interactions analyzed in this step may correspond to some or all messages exchanged over the asynchronous communication channel.

The method may continue with the chatbot engine 148 and/or dialog engine 164 applying some or all of the messages exchanged during the historical communications to a predictive conversation model 156 (step 2208). The predictive conversation model 156 may then be used to detect that a pattern of communications exists between the customer 116 and the contact center 108 (step 2212). In response to and based on detecting the pattern of communications, an agent work force schedule may be updated to account for the pattern of communications (step 2216). The agent work force schedule may be updated by an agent workforce management engine or by some other server depicted and described in the contact center 108 (e.g., the routing engine 124, contact management server 132, etc.).

Based on the update to the agent work force schedule, one or more human agents 172 may be deployed in the contact center 108 to accommodate an expected workload (step 2220). In some embodiments, the expected workload may be based, at least in part, on the detected pattern of communications between the customer 116 and the contact center 108. It should be appreciated that this particular method may be scaled to analyze a plurality of customer interactions and to build a predictive communication model based on the plurality of historical customer interactions.

Figure 23A:
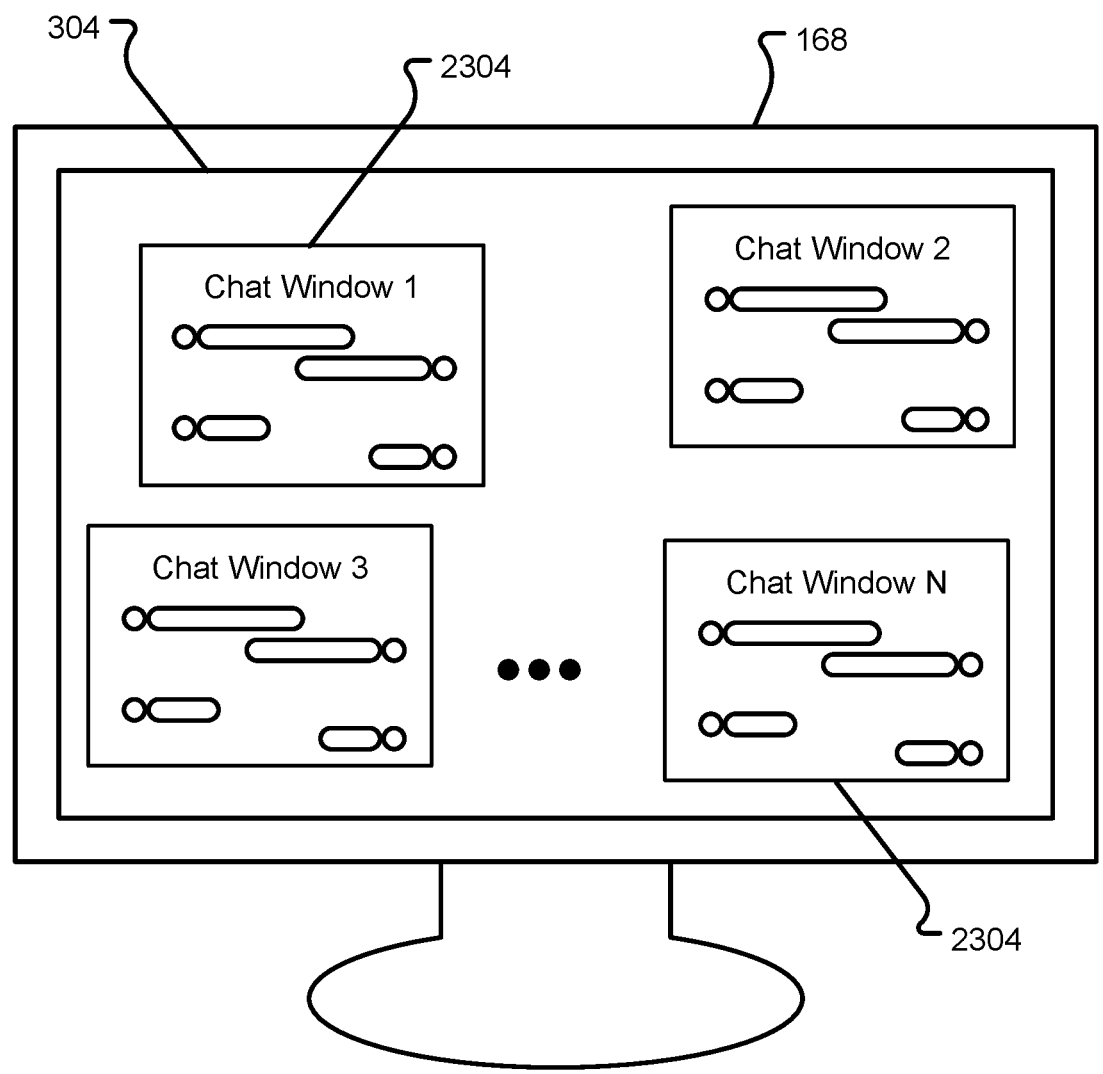
FIG. 23A is a screen shot depicting a graphical user interface of an agent communication device displaying a plurality of chat windows in accordance with at least some embodiments of the present disclosure.
Figure 23B:
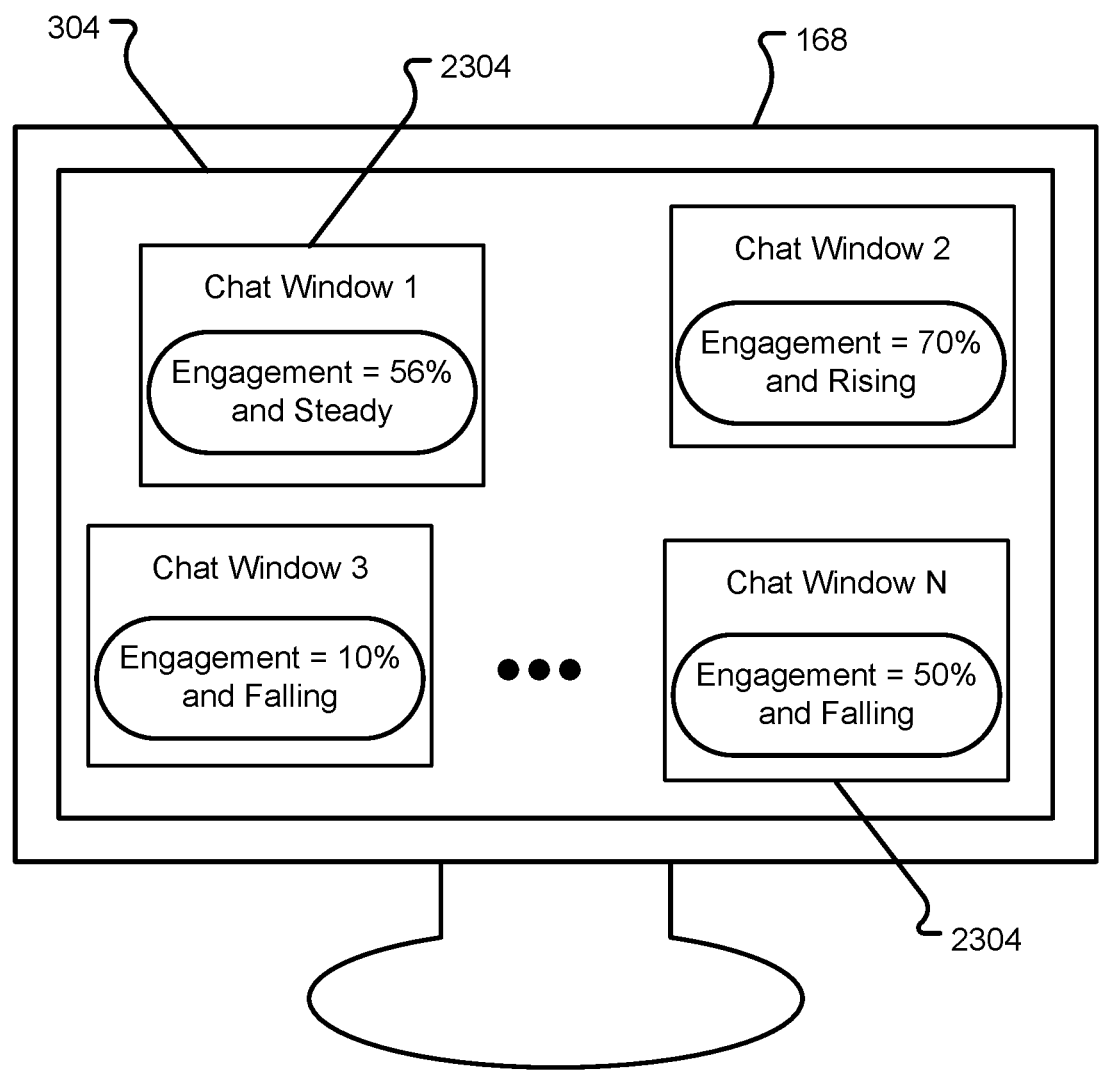
FIG. 23B is a screen shot depicting a graphical user interface of an agent communication device displaying a plurality of chat windows and associated engagement factors in accordance with at least some embodiments of the present disclosure.
Figure 23C:
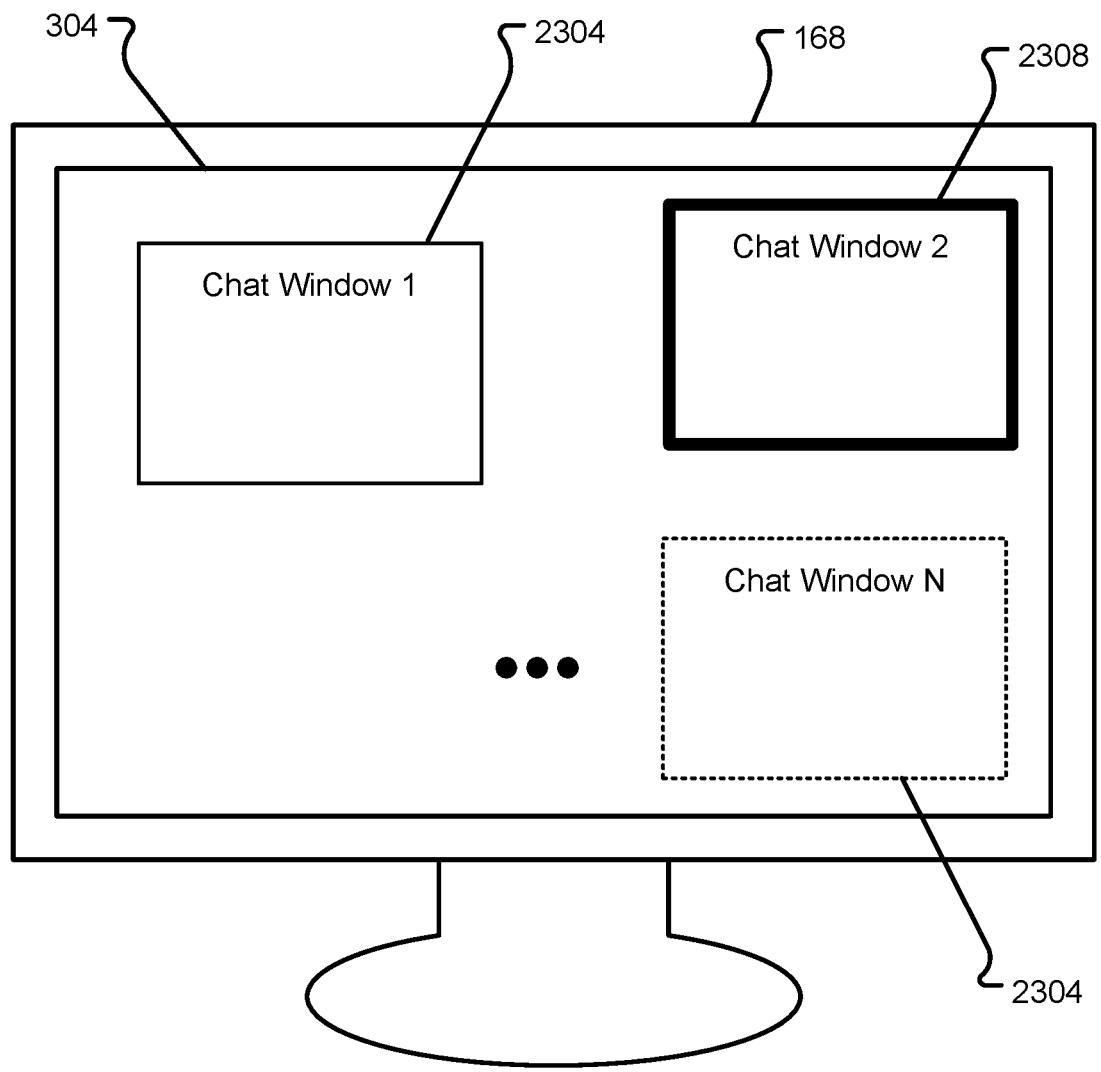
FIG. 23C is a screen shot depicting an altered graphical user interface of an agent communication device in accordance with at least some embodiments of the present disclosure.

With reference now to FIGS. 23A-23C, additional embodiments will be described in connection with monitoring conversation content and context and then automatically updating a graphical user interface of an agent 172 based on the monitored conversation content and context. In particular, FIG. 23A illustrates a screen shot of a graphical user interface 304 of an agent communication device 168 displaying a plurality of chat windows 2304. Each chat window 2304 may contain content exchanged between an agent 172 (or chatbot engine 148) and a customer 116. In some embodiments, each chat window 2304 may represent a different work item to the agent 172 and may be associated with a different asynchronous communication channel established between the contact center 108 and a different customer 116. In other words, a single agent 172 may be responsible for maintaining multiple different conversations with different customers 116 via each of the different chat windows 2304. Thanks to the asynchronous nature of the communication channel supported by the contact center 108, the customer 116 may not expect an immediate response to their message, thereby allowing the agent 172 to have multiple conversations/work items assigned to them at the same time.

It should be appreciated that while the chat window 2304 will be described in connection with supporting an asynchronous text-based communication session, the agent 172 may use different communication channels to process a work item and communicate with the customer 116. For instance, the graphical user interface 304 may present the agent 172 with a number of different applications (e.g., chat applications, email applications, social media applications, web-collaboration applications, etc.). A suitably skilled agent 172 may utilize different communication channels simultaneously to carry on different conversations with different customers 116. Embodiments of the present disclosure should not be construed as being limited to chat or IM simply because a chat window 2304 is described as the GUI element for presenting conversation content to the agent 172.

As shown in FIG. 23A, each of the plurality of chat windows 2304 may be presented via the graphical user interface 304 substantially simultaneously. The presented chat windows 2304 may not necessarily represent every conversation currently assigned to the agent 172. Rather, one or more chat windows 2304 or GUI elements may be minimized or hiding behind another chat window 2304. If a new customer message is received for a conversation with a chat window 2304 currently hidden from view, then the associated chat window 2304 may be brought in front of other chat windows or highlighted for the agent 172 to signify that an agent response to the customer message is required.

With reference to FIG. 23B, it can be seen that conversational activity and customer 116 engagement for each conversation assigned to the agent 172 may not be equal. Rather, some chat windows 2304 may have higher levels of customer 116 engagement (e.g., the customer 116 is responding quickly to the agent 172 and with substantive input) whereas other chat windows 2304 may have lower levels of customer 116 engagement. In accordance with at least some embodiments, each the content and context of each conversation assigned to the agent 172 may be analyzed to determine a customer 116 engagement level as well as a conversation velocity. In the depicted example, a first conversation associated with the first chat window 2304 may have a determined engagement level of 56% that is holding steady (e.g., not changing by more than 10% within a predetermined period of time). A second conversation associated with the second chat window 2304 may have a higher determined engagement level of 70% that is also rising (e.g., has a positive conversational velocity above a predetermined threshold). A third conversation associated with the third chat window 2304 may have a lower determined engagement level of 10% that is falling (e.g., has a negative conversational velocity that is below a predetermined threshold). An Nth conversation associated with the Nth chat window 2304 may have an average determined engagement level of 50% that is falling. Actions that may be taken by the agent communication device 168 in response to such determinations of customer engagement and velocity will now be described with reference to FIG. 23C.

In the example of FIG. 23C, the graphical user interface 304 is shown to have the second chat window 2304 highlighted 2308 whereas the third chat window 2304 was automatically removed/closed and the Nth chat window 2304 is minimized or presented in a less conspicuous manner than other chat windows 2304 having a higher customer engagement and/or conversational velocity. In some embodiments, the automated actions of closing, minimizing, or highlighting a chat window 2304 (or other associated GUI element) for a particular conversation may be triggered in response to analyzing content and context of each conversation.

In accordance with at least some embodiments, the chatbot engine 148 and/or dialog engine 164 may be configured to perform the analysis of conversation and determine the customer engagement level as well as the conversational velocity. Both of these factors (and possibly other factors) may result in the chatbot engine 148 and/or dialog engine 164 sending a command to the agent communication device 168 that causes the agent communication device 168 to perform the automated action. It may be desirable to enable automated actions at the agent communication device 168 because the agent 172 is having to split their attention across multiple conversations. When devoting attention to highly active conversations, it is less likely that the agent 172 will notice a particular conversation is becoming less active (e.g., based on customer engagement and/or conversational velocity) and so the agent 172 will keep the chat window 2304 on the graphical user interface 304. Such inaction may result in the graphical user interface 304 becoming unnecessarily crowded with multiple chat windows 2304 that are associated with conversations that do not require the agent's 172 attention. Accordingly, embodiments of the present disclosure propose the ability to enable the chatbot engine 148 and/or dialog engine 164 to automatically clean up or manage the graphical user interface 304 for the agent 172 based on information obtained from associated conversations.

In some embodiments, new customer messages for all conversations in the contact center 108 may be provided to the chatbot engine 148 and/or dialog engine 164 where conversational features like intent, entities, and possibly sentiment can be analyzed. The chatbot engine 148 and/or dialog engine 164 may be configured to utilize one or more conversation models 156 to determine a probability that represents the likelihood that the customer 116 is still engaged in the conversation. Specifically, when a new customer message is received, the conversation model 156 may be polled at regular intervals to produce the new engagement probability. Thereafter, the engagement probability would be compared to an engagement threshold (e.g., 50%) to determine if the customer 116 has likely disengaged from the conversation, at least for a period of time. If yet another customer message is received before the engagement probability falls below the engagement threshold, then the evaluation performed by the chatbot engine 148 and/or dialog engine 164 with the conversation model(s) 156 may be performed again. If the engagement probability falls below the engagement threshold before a new customer message arrives, then the agent 172 may be relieved of responsibility for managing the conversation. In this situation, the conversation and the chat window 2304 associated with the conversation may be parked (e.g., closed, minimized, etc.) as idle until the customer 116 responds with a new customer message.

A variation of this concept may enable the chatbot engine 148 and/or dialog engine 164 to produce a signal indicating that the engagement probability for the conversation has fallen below a second engagement threshold (e.g., 15%). In response to the chatbot engine 148 and/or dialog engine 164 determining the engagement probability has fallen yet again and further than before when the conversation was parked as idle, the contact center 108 may now consider the conversation complete and accordingly close the chat window 2304 for the associated conversation. The contact center 108 may also remove the work item associated with the conversation from assignment with the agent 172, thereby relieving the agent of any responsibility for the conversation and causing any such activity (or inactivity) associated with the conversation to not impact the agent's 172 Key Performance Indicators (KPIs).

It should be appreciated that embodiments of the present disclosure enable the chatbot engine 148 and/or dialog engine 164 to produce a probability curve that enables a determination of customer engagement over time based on input text, extracted analytical values, etc. The conversation models 156 used for this purpose may be sampled at predetermined time intervals after the customer message has been received to produce the engagement probability and conversational velocity. At all times or periodically, the engagement probability and/or conversational velocity may be compared with appropriate thresholds until either a new customer message is received or the probability of engagement and/or conversational velocity has dropped below a particular threshold.

It should be appreciated that while concepts described herein refer to an engagement probability, it may also be appropriate to refer to disengagement probabilities and compare such disengagement probabilities with appropriate thresholds to determine whether a customer 116 is likely (or not) to require additional attention from an agent 172 within a predetermined amount of time. Because many conversations assigned to an agent 172 may be facilitated over an asynchronous communication channel, it may be difficult to determine the true end of a conversation versus a disengagement with a likelihood of resumption.

It can be difficult to determine the "true" end of a conversation versus a disengagement with likelihood of resumption. In the past, a timeout period was used to determine that a digital channel user disengaged. The determination requires the agent 172 to wait for the full period of the timeout before the work item can be "parked." Embodiments of the present disclosure enable the chatbot engine 148 and/or dialog engine 164 to model content of a conversation to determine a probability of engagement (or disengagement) based on time since last user message and change in conversation state 152.

It should also be appreciated that some conversations may have natural breaks where the customer 116 has been asked to perform a task that takes time (e.g., modeling shows that 95% of conversations on this topic have a disengagement at this point if the customer 116 does not respond with a next customer message in 2 minutes). Some conversations may have content that can indicate that the user will be disengaging purposefully for an extended period of time (e.g., Customer: "I will check tomorrow and get back to you."). The conversational context and historic patterns of engagement and disengagement are modeled to provide a prediction and to enable better management of the agent's 172 time and attention.

Figure 24:
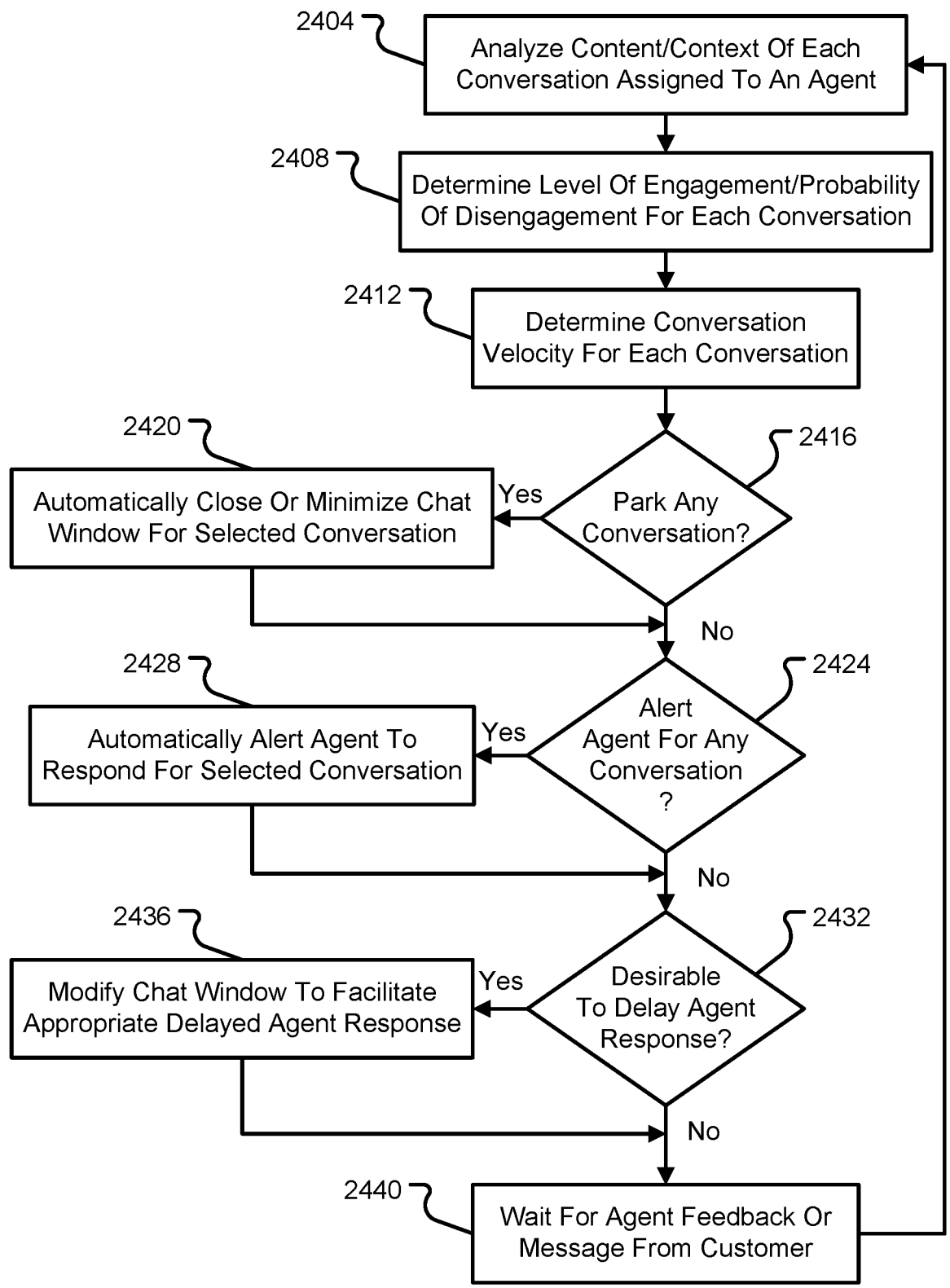
FIG. 24 is a flow diagram depicting an eighteenth communication method in accordance with at least some embodiments of the present disclosure.

Referring now to FIG. 24, an additional communication method enabled by the chatbot engine 148 and/or dialog engine 164 will be described in accordance with at least some embodiments of the present disclosure. The method may be used to implement the behaviors depicted and described in connection with FIGS. 23A-23C. The method may start by enabling the chatbot engine 148 and/or dialog engine 164 to analyze the content/context of each conversation assigned to an agent 172 (or to all agents in the contact center 108) (step 2404). The analysis may be performed immediately upon receiving a new customer message for a conversation or in response to some other trigger event (e.g., a request from an agent 172). The analysis may be performed across multiple conversations that are assigned to a particular agent 108 or for every conversation assigned to every agent 172 in the contact center 108.

The method continues with the chatbot engine 148 and/or dialog engine 164 determining a customer engagement level (e.g., a customer engagement probability or customer disengagement probability) for each conversation (step 2408). In some embodiments, the analysis performed in step 2404 results in the determination of a customer engagement level for each conversation. The method may also include the chatbot engine 148 and/or dialog engine 164 determining a conversational velocity for each conversation (step 2412). The steps 2408 and 2412 may be performed concurrently or in any order and both may be based on the analysis of step 2404.

The method further continues with the chatbot engine 148 and/or dialog engine 164 determining whether any automated actions are to be taken for one or more conversations based on determinations made in steps 2408 and 2412. Specifically, the chatbot engine 148 and/or dialog engine 164 may determine if any conversation should be parked as idle (step 2416). This determination may be affirmatively made in response to comparing the customer engagement probability (or disengagement probability) with a predetermined probability threshold and/or in response to comparing the conversational velocity with a predetermined velocity threshold. If the decision is made to park any particular conversation as idle, then the chatbot engine 148 and/or dialog engine 164 may provide appropriate instructions to an agent communication device 168 to minimize, hide, or close a chat window 2304 associated with the conversation that is being parked as idle (step 2420).

The method may also include determining, by the chatbot engine 148 and/or dialog engine 164, whether an agent 172 needs to be alerted with respect to any conversation (step 2424). In some embodiments, an alert may include highlighting a chat window 2304 associated with a conversation and/or sending a message to the agent 172 indicating that an agent response is needed for the particular conversation. Again, determining whether or not to provide an alert in connection with a particular conversation may include comparing the engagement probability with an appropriate probability threshold (which may be different from the threshold used in step 2416) and/or comparing the conversational velocity with an appropriate velocity threshold (which may be different from the threshold used in step 2416). As shown in FIG. 23C, the alert may be provided by changing one or more properties of the chat window 2304 (e.g., making it larger, bolder, different color, etc.) and/or by bringing the appropriate chat window 2304 into a more conspicuous position on the agent's 172 graphical user interface 304 (step 2428).

The method may also include determining, by the chatbot engine 148 and/or dialog engine 164, whether it would be desirable to delay an agent response for a particular conversation (e.g., to slow down the conversational velocity or because it does not appear that the customer 116 is immediately expecting a response from the agent) (step 2432). Like steps 2416 and 2424, this step may include comparing the engagement probability with an appropriate probability threshold (which may be different from the thresholds used in steps 2416 and 2424) and/or comparing the conversational velocity with an appropriate velocity threshold (which may be different from the thresholds used in steps 2416 and 2424). If this query is answered affirmatively for any particular conversation, then the method may continue with the chatbot engine 148 and/or dialog engine 164 providing an instruction to an agent communication device 168 to modify the associated chat window or otherwise notify the agent 172 that a delayed response is acceptable (and possibly desirable) (step 2436). The modification to the chat window 2304 may include hiding the chat window 2304 until such time as an agent response is desired/required and/or providing a message to the agent 172 within the chat window 2304 that indicates a response is not required. The modification to the chat window 2304 may also include a suggested response prepared by the chatbot engine 148 and/or dialog engine 164 for review and approval by the agent 172, but along with a note that the response (when approved) will not be sent to the customer communication device for at least a predetermined amount of time.

It should be appreciated that steps 2416, 2424, and 2432 may be performed simultaneous with one another and various types of automated actions may be taken simultaneously. Indeed, the order with which steps 2416, 2424, and 2432 (and their associated automated actions in response to an affirmative determination) may be performed in any order without departing from the scope of the present disclosure.

After automated actions have been taken for any conversations deemed appropriate, the method may continue by waiting for agent 172 input or for another customer message (step 2440). In response to agent 172 input and/or another receipt of another customer message, the method may revert back to step 2404 where the analysis is performed again on the newly-received customer message and/or content shared by the agent 172.

Figure 25:
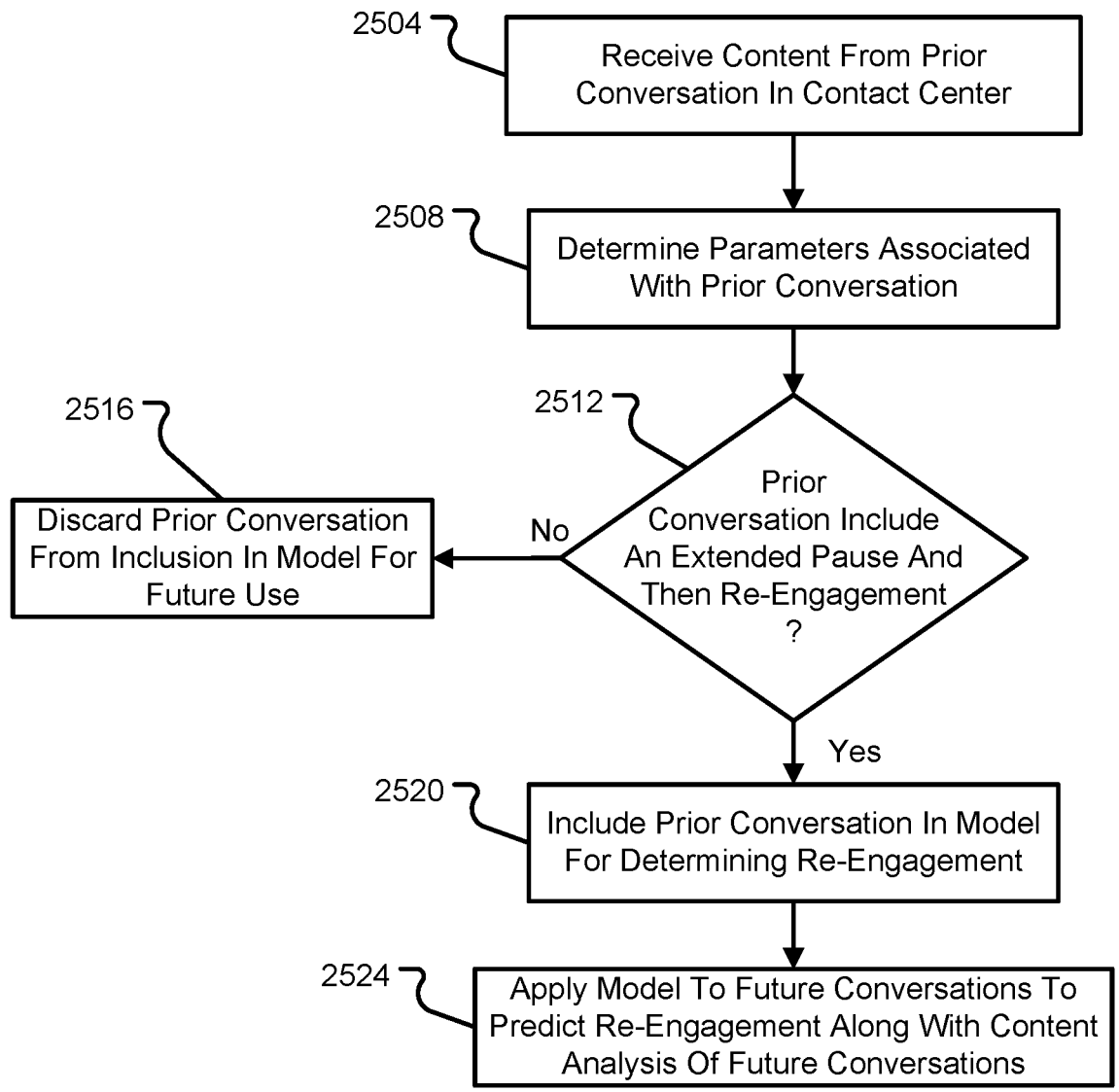
FIG. 25 is a flow diagram depicting a nineteenth communication method in accordance with at least some embodiments of the present disclosure.

Referring now to FIG. 25, an additional communication method enabled by the chatbot engine 148 and/or dialog engine 164 will be described in accordance with at least some embodiments of the present disclosure. The method begins by receiving content from a prior conversation that occurred between the contact center 108 and a customer 116 (step 2504). The conversation may correspond to a previous conversation between a single customer 116 and a single agent (e.g., a human agent 172 and/or automated agent) and the conversation may have utilize one or a number of different communication channels. In some embodiments, the conversation may correspond to a text-based conversation that occurred over an asynchronous communication channel. In some embodiments, the conversation may include a non-text-based conversation (e.g., a voice or video conversation) or the conversation may include both text and non-text content.

The method may continue by determining one or more parameters associated with the prior conversation (step 2508). Such parameters may include metadata of the conversation (e.g., time of conversation, duration of message exchanges, maximum conversational velocity, customer 116 information, length of messages exchanged, etc.).

The content and parameters of the prior conversation may be analyzed to determine if the prior conversation included an extended pause and then a customer re-engagement on a common topic (e.g., a topic that was being discussed prior to the extended pause) (step 2512). An extended pause may correspond to any length of conversational pause or delay in message exchanges that resulted in the conversational velocity falling below a predetermined threshold. Alternatively or additionally, an extended pause may correspond to any amount of time that exceeds a predetermined time threshold. Alternatively or additionally, an extended pause may correspond to any amount of time that results in a human agent 172 being undesirably assigned to the conversation even though no message is received from the customer 116 for the amount of time. As an example, an extended pause may correspond to an amount of time on the order of a couple of minutes, an hour, multiple hours, or any length of time that is longer than a human agent's 172 shift.

If the prior conversation is determined to not include an extended pause or not include some aspect of re-engagement after an extended pause, the method may continue by discarding the prior conversation (step 2516). Specifically, the prior conversation may be determined to be a poor candidate for determining re-engagement since it did not exhibit an appropriate re-engagement of a conversation. In response to making such a determination, the conversation may be discarded such that it is not included in a model for future use in determining re-engagement, although the conversation may still be included in other models used to determined other aspects of a conversation.

If the query of step 2512 was answered positively, however, the method may proceed by including the prior conversation in a model (or multiple models) for determining customer re-engagement (step 2520). In this way, the model may be applied to future conversations to predict customer 116 re-engagement (step 2524). The model may be used to predict customer 116 re-engagement in addition to using other conversational analysis techniques described herein (e.g., content-based analysis of future conversation, customer-specific analysis, etc.).

Figure 26:
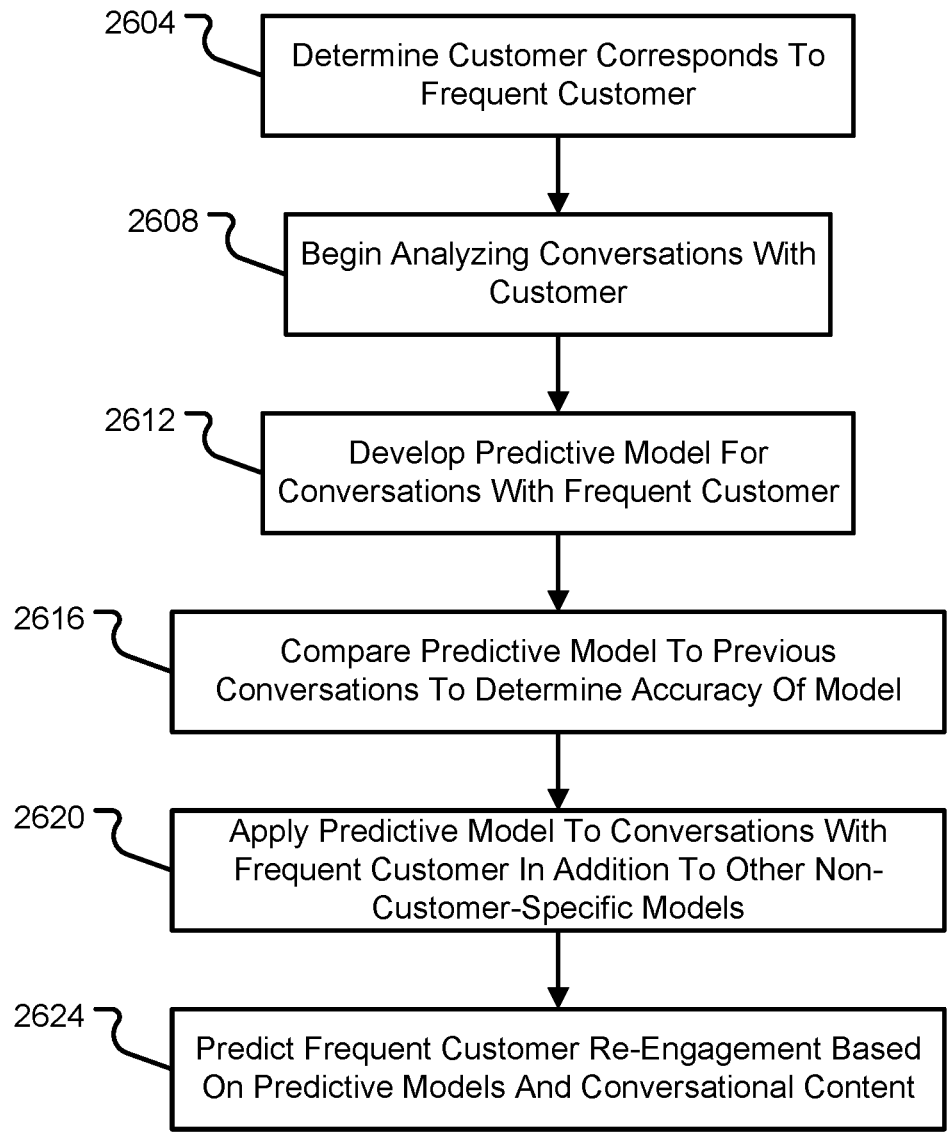
FIG. 26 is a flow diagram depicting a twentieth communication method in accordance with at least some embodiments of the present disclosure.

With reference now to FIG. 26, yet another communication method enabled by the chatbot engine 148 and/or dialog engine 164 will be described in accordance with at least some embodiments of the present disclosure. The method may begin by determining that a particular customer 116 corresponds to a frequent customer 116 of the contact center 108 (step 2604). A frequent customer 116 may correspond to any customer or entity that interacts or has previously interacted with the contact center 108 more than a predetermined number of times (e.g., more than two times in the past). Alternatively or additionally, a frequent customer 116 may correspond to a customer 116 that has only interacted with the contact center 108 once, but is in a position where more future interactions are anticipated. Alternatively or additionally, a frequent customer 116 may correspond to a customer 116 that interacts with a business with a predetermined frequency or more than a predetermined number of times, but doesn't necessarily interact with the contact center 108 for each of those interactions (e.g., the customer 116 frequents the businesses' website or brick and mortar store with some regularity). Alternatively or additionally, a frequent customer 116 may correspond to any customer 116 that has a preferred status with a company (e.g., gold statute, premier status, etc.) regardless of whether or not the customer 116 interacts with the company at a particular frequency.

The method may continue with the chatbot engine 148 and/or dialog engine 164 analyzing conversations between the contact center 108 and the customer 116 (step 2608). The analysis may include an analysis of content and/or metadata associated with one or multiple conversations. The analysis may be performed on a number of different communication channels and may span multiple conversations.

Based on the analysis of the conversation(s), the method may continue with the development of a predictive model that represents the content and/or metadata from the conversation(s) (step 2612). The predictive model may then be compared to the same or additional previous conversations that have occurred between the customer 116 and the contact center 108 to determine an accuracy of the model (step 2616). The predictive model may also be compared to other predictive models that have been built for other customers 116 and their conversations and/or that have been previously prepared based on other training data. As the contact center 108 continues to operate, the predictive model may continue to be compared to conversations to determine if the predictive model is drifting away from or maintaining a close relationship with the dynamics of ongoing conversations.

The method may further include applying the predictive model to conversations between the frequent customer 116 to assist in predicting whether or not the customer 116 is continuing a conversation with the contact center 108 on a particular topic or starting a different conversation on a different topic (step 2620). Based on application of the predictive model and other non-customer-specific analytics, the method may proceed by predicting engagement or re-engagement of the customer 116 with the contact center 108 after a period of inactivity on a particular communication channel (step 2624). This step may also include predicting disengagement of the customer 116 from a conversation. While the use of a customer-specific predictive model may be useful in connection with predicting behaviors of that particular customer 116, it should be appreciated that other techniques (e.g., non-customer-specific techniques) described herein may still be used to predict behaviors of a customer 116. Such non-customer-specific techniques may be used in addition to or in lieu of customer-specific predictive modeling. In some embodiments, it may be possible to provide a fall back strategy that would seek to use the model with the finest granularity. As an example, the customer-specific model would be the first choice, followed by a fall back to demographic-based models (e.g., a membership level, customer location, customer language, etc.), then finally to a generic model based on all users.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of predicting future communications to be exchanged over a digital communication channel in an asynchronous communication system, the method comprising:
analyzing, with a processor, interactions on the digital communication channel, wherein the interactions include messages exchanged between a customer operating a customer communication device and an agent operating an agent communication device;
based on the analysis of the interactions, predicting, with the processor, that the interactions are about to pause for an amount of time;
analyzing, with the processor, content of the interactions to determine an estimate of the amount of time;
updating, with the processor, a state of the agent to release the agent for the estimated amount of time; and
setting a timer that will cause the processor to automatically change the state of the agent back to an occupied state for the interactions at a future time that aligns with an expiration of the timer.

2. The method of claim 1, further comprising:
determining that the content of the interactions includes a time indicator; and
utilizing the time indicator as part of determining the estimate of the amount of time.

3. The method of claim 1, further comprising:
analyzing content of the interactions;
based on the analysis of the content of the interactions, determining a context of the interactions to include a mention of time; and
utilizing the mention of time as part of determining the estimate of the amount of time.

4. The method of claim 1, further comprising:
building a predictive model based on one or more previous interactions; and
using the predictive model to determine the estimate of the amount of time.

5. The method of claim 4, wherein the predictive model is built with information obtained from a previous interaction involving the customer.

6. The method of claim 4, wherein the predictive model is built with information obtained from interactions involving customers other than the customer.

7. The method of claim 1, further comprising:
searching the digital communication channel for communications initiated by the customer;
detecting that the customer has reengaged the interactions prior to the expiration of the timer; and
in response to detecting that the customer has reengaged the interactions, determining that the agent is currently unavailable to resume the interactions; and
providing an option to the customer to either wait for the agent to become available or to resume the interactions with an alternate agent.

8. The method of claim 1, wherein the messages exchanged prior to the pausing of interactions are of a first message type and wherein messages exchanged after the pausing of interactions are of a second message type that is different from the first message type.

9. The method of claim 8, wherein the first message type comprises a text-based message and wherein the second message type comprises a voice-based message.

10. The method of claim 1, further comprising:
detecting a pattern of communication for the customer; and
based on the detected pattern of communication for the customer, scheduling a time for the agent to initiate contact with the customer.

11. A communication system, comprising:
a processor; and
computer memory storing data thereon that enables the processor to:
analyze interactions on a digital communication channel, wherein the interactions include messages exchanged between a customer operating a customer communication device and an agent operating an agent communication device;
based on the analysis of the interactions, predicting that the interactions are about to pause for an amount of time;
analyzing content of the interactions to determine an estimate of the amount of time; and
updating a state of the agent to release the agent from further interactions with the customer for at least the estimated amount of time.

12. The communication system of claim 11, wherein the data stored on the computer memory further enables the processor to:
set a timer that will automatically change the state of the agent back to an occupied state for the interactions at a future time that aligns with an expiration of the timer.

13. The communication system of claim 11, wherein the data stored on the computer memory further enables the processor to:
determine that the content of the interactions includes a time indicator; and
utilize the time indicator as part of determining the estimate of the amount of time.

14. The communication system of claim 11, wherein the data stored on the computer memory further enables the processor to:
build a predictive model based on one or more previous interactions; and
using the predictive model to determine the estimate of the amount of time.

15. The communication system of claim 11, wherein the data stored on the computer memory further enables the processor to:
search the digital communication channel for communications initiated by the customer;
detect that the customer has reengaged the interactions;
in response to detecting that the customer has reengaged the interactions, determine that the agent is currently unavailable to resume the interactions; and
provide an option to the customer to either wait for the agent to become available or to resume the interactions with an alternate agent.

16. A contact center, comprising:
a server comprising a processor and a chatbot engine that is executable by the processor and that enables the processor to:
analyze interactions on a digital communication channel, wherein the interactions include messages transmitted by a customer operating a customer communication device;
based on the analysis of the interactions, predict that the interactions are about to pause for an amount of time;
analyzing content of the interactions to determine an estimate of the amount of time; and updating a state of an agent to release the agent from further interactions with the customer for at least the estimated amount of time.

17. The contact center of claim 16, wherein the chatbot engine further enables the processor to:
set a timer that will automatically change the state of the agent back to an occupied state for the interactions at a future time that aligns with an expiration of the timer.

18. The contact center of claim 16, wherein the chatbot engine further enables the processor to:
build a predictive model based on one or more previous interactions; and
using the predictive model to determine the estimate of the amount of time.

19. The contact center of claim 18, wherein the predictive model is built with information obtained from a previous interaction involving the customer.

20. The contact center of claim 16, wherein the chatbot engine further enables the processor to:
detect a pattern of communication for the customer; and
based on the detected pattern of communication for the customer, schedule a time for the agent to initiate contact with the customer.

\* \* \* \* \*